United States Patent
Bhatt

(10) Patent No.: US 10,192,189 B2
(45) Date of Patent: Jan. 29, 2019

(54) MOBILE PICKUP LOCATIONS

(71) Applicant: Amazon Technologies, Inc., Reno, NV (US)

(72) Inventor: Kushal Mukesh Bhatt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 785 days.

(21) Appl. No.: 14/180,037

(22) Filed: Feb. 13, 2014

(65) Prior Publication Data

US 2015/0227882 A1   Aug. 13, 2015

(51) Int. Cl.
  *G06Q 30/00*  (2012.01)
  *G06Q 10/08*  (2012.01)

(52) U.S. Cl.
  CPC ................. *G06Q 10/083* (2013.01)

(58) Field of Classification Search
  CPC .................................................. G06Q 10/083
  USPC .......... 705/330, 1.1, 339, 26.1, 15; 700/237, 700/214, 242; 232/36, 19, 24
  See application file for complete search history.

(56) References Cited

U.S. PATENT DOCUMENTS

| | | | | |
|---|---|---|---|---|
| 2,398,602 A * | 4/1946 | Sibley | .......... | E05C 17/085 16/85 |
| 4,865,248 A * | 9/1989 | Barth | .......... | A47G 29/20 232/24 |
| 5,386,462 A * | 1/1995 | Schlamp | .......... | G07C 9/00103 379/93.12 |
| 6,344,796 B1 * | 2/2002 | Ogilvie | .......... | A47G 29/141 340/5.2 |
| 6,426,699 B1 * | 7/2002 | Porter | .......... | A47F 10/00 221/2 |
| 6,690,997 B2 * | 2/2004 | Rivalto | .......... | G06Q 10/08 700/237 |
| 6,694,217 B2 * | 2/2004 | Bloom | .......... | G06Q 20/00 700/215 |
| 6,919,803 B2 * | 7/2005 | Breed | .......... | G06Q 20/203 340/426.19 |
| 6,961,711 B1 * | 11/2005 | Chee | .......... | G06Q 10/083 232/27 |

(Continued)

FOREIGN PATENT DOCUMENTS

WO   WO2013148123   10/2013

OTHER PUBLICATIONS

NPL search attached.*

(Continued)

*Primary Examiner* — John H. Holly
(74) *Attorney, Agent, or Firm* — Athorus, PLLC

(57) ABSTRACT

A mobile pickup location is provided that may be associated with a vehicle such as a public bus. A user may choose to have items delivered to a mobile pickup location on a public bus which the user takes every day travelling from the office to home, or which stops at a bus stop that is convenient for the user. Also, in regions where carriers for delivering items are rare or prohibitively expensive, a mobile pickup location may be utilized to deliver items, such as to a rural village. The coordinates of a mobile pickup location may be tracked, such as with GPS, and a user may be provided with a notification when a mobile pickup location with an ordered item is approaching, such as with a text message sent to a cell phone.

25 Claims, 11 Drawing Sheets

(56) References Cited

U.S. PATENT DOCUMENTS

| | | | | |
|---|---|---|---|---|
| 6,970,838 B1* | 11/2005 | Kamath | ............. | G06Q 30/0206 700/14 |
| 7,129,817 B2* | 10/2006 | Yamagishi | ......... | G07C 9/00142 340/5.53 |
| 7,133,743 B2* | 11/2006 | Tilles | ...................... | G07F 17/12 700/242 |
| 7,188,513 B2* | 3/2007 | Wilson | ................. | G01N 1/2226 73/31.01 |
| 7,337,686 B2* | 3/2008 | Sagi-Dolev | ........ | G01N 35/0099 340/521 |
| 7,337,944 B2* | 3/2008 | Devar | ................. | A47G 29/141 232/19 |
| 7,693,745 B1* | 4/2010 | Pomerantz | ............. | G06Q 10/08 705/26.5 |
| 7,925,375 B2* | 4/2011 | Schininger | ............ | G07F 11/007 221/131 |
| 8,078,317 B2* | 12/2011 | Allinson | ............. | G06F 19/3462 700/236 |
| 8,145,351 B2* | 3/2012 | Schininger | ................ | E05G 1/06 221/12 |
| 8,195,328 B2* | 6/2012 | Mallett | ................... | A61L 11/00 700/236 |
| 2001/0045449 A1* | 11/2001 | Shannon | .............. | A47G 29/141 232/19 |
| 2002/0116289 A1* | 8/2002 | Yang | ...................... | G06Q 10/08 705/26.81 |
| 2004/0084527 A1* | 5/2004 | Bong | ................... | G06Q 10/087 235/385 |
| 2007/0073552 A1* | 3/2007 | Hileman | ................ | G06Q 10/02 705/5 |
| 2007/0150375 A1 | 6/2007 | Yang | | |
| 2007/0170237 A1* | 7/2007 | Neff | ..................... | A47G 29/122 232/36 |
| 2007/0247276 A1* | 10/2007 | Murchison | ......... | G07C 9/00087 340/5.2 |
| 2007/0247277 A1* | 10/2007 | Murchison | ......... | G07C 9/00087 340/5.2 |
| 2007/0266081 A1* | 11/2007 | Murchison, III | ....... | G07F 17/12 709/203 |
| 2008/0154623 A1* | 6/2008 | Derker | ................. | G06Q 10/087 705/1.1 |
| 2009/0063166 A1* | 3/2009 | Palmer | ..................... | A47F 5/06 705/5 |
| 2009/0106124 A1* | 4/2009 | Yang | ..................... | G06Q 10/08 705/26.1 |
| 2012/0039694 A1* | 2/2012 | Suzanne | ............. | B65G 63/045 414/339 |
| 2012/0109419 A1* | 5/2012 | Mercado | ................ | G06Q 10/02 701/2 |
| 2012/0235786 A1* | 9/2012 | Rudduck | ............. | G06Q 10/083 340/5.54 |
| 2013/0261792 A1* | 10/2013 | Gupta | .................... | G06Q 10/08 700/232 |
| 2013/0262251 A1 | 10/2013 | Wan et al. | | |
| 2013/0262276 A1* | 10/2013 | Wan | ...................... | G06O 10/00 705/28 |
| 2013/0262336 A1* | 10/2013 | Wan | ................... | G06Q 10/0836 705/339 |
| 2014/0052661 A1* | 2/2014 | Shakes | ............... | G06Q 10/0836 705/339 |
| 2014/0358703 A1* | 12/2014 | Stuntebeck | .......... | G06Q 10/083 705/15 |
| 2015/0006005 A1 | 1/2015 | Yu et al. | | |

OTHER PUBLICATIONS

"International Search Report and Written Opinion of PCT Application No. PCT/US2015/015283 dated May 13, 2015."

U.S. Appl. No. 12/398,602, filed Mar. 5, 2009, Qaseem Ahmed Shaikh.

International Preliminary Report on Patentability for PCT Application No. PCT/US2015/015283 dated Aug. 16, 2016.

Examiner's Report for Canadian Patent Application No. 2,939,548 dated Jul. 4, 2017.

Extended European Search Report for EP Patent Application No. 15749119.2 dated May 29, 2017.

\* cited by examiner

MOBILE PICKUP LOCATIONS

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

Typically ordered items are packed in shipping packages (e.g., corrugated boxes) and shipped to the customer's residence or place of business. Alternatively, a customer may order an item and designate a pickup location as the delivery location. A pickup location may include a control station and storage compartments where the items that are ordered from a materials handling facility can be delivered for pickup by customers. Rather than shipping the item to a residence or place of business, the item may be shipped to the pickup location and stored in a storage compartment for retrieval by the customer. However, some customers may not live or work near pickup locations, or may otherwise not want to take the time to travel to one. In addition, some customers may live and work in regions where there are few or no carriers for delivering packages, thus complicating the delivery of items to any destinations near the customer.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
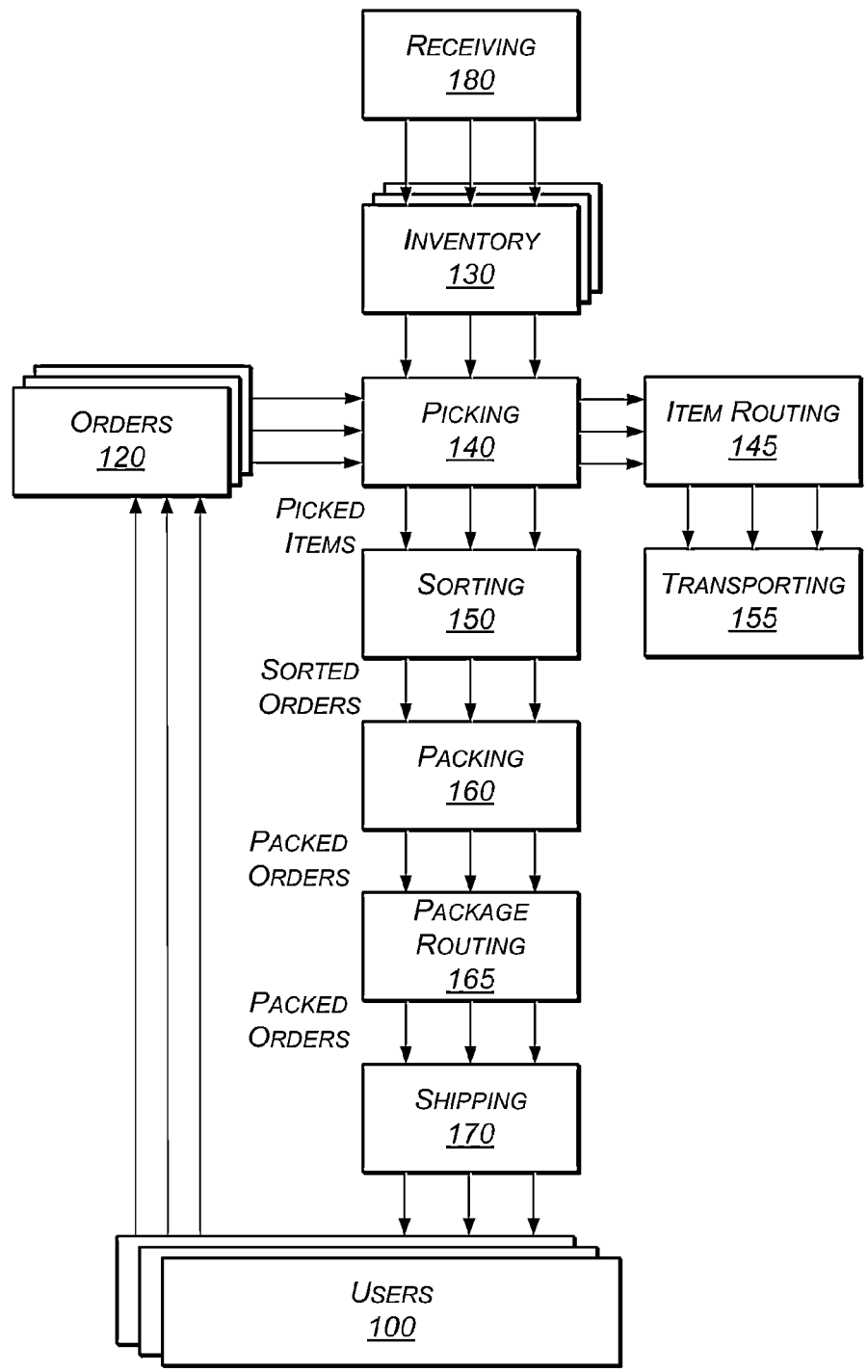
FIG. 1 illustrates a broad view of the operation of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes systems and methods for utilizing mobile pickup locations. Instead of a user needing to walk or drive to a pickup location at a fixed position, a mobile pickup location may be provided that moves closer to the user. In various implementations, a mobile pickup location may be associated with a vehicle such as a public bus, train, subway car, boat, airplane, helicopter, etc. (generally referred to herein as a "vehicle"). A user may then choose to have items delivered to the mobile pickup location on the vehicle which the user takes every day travelling from the office to home, or which stops at a bus stop, station or other location that is convenient for the user. Also, in regions where carriers for delivering items are rare or prohibitively expensive, a mobile pickup location may be utilized to deliver items. For example, for a user who lives in a rural village, an item can be delivered in a mobile pickup location on a vehicle which has a stop near the village.

To assist with the selection of a mobile pickup location for the delivery of an item, a user may be presented with options that are convenient for the user. In various implementations, the user may enter information such as an address or region, a time of day, etc., which may be utilized by the system for determining which mobile pickup location(s) will be most convenient for the user. For example, in an implementation where public busses are utilized for the mobile pickup locations, a user may begin by entering an address or area, in response to which the system may present a list of bus stops near the address or area. Once the user selects a bus stop, the system may present a list of time windows during which different busses carrying mobile pickup locations are scheduled to be at the stop, which can be selected by the user. Once the user has made a final selection for the mobile pickup location, instructions may be provided to the user including any needed details (e.g., bus route number, access code, etc.) so that the user will be able to retrieve the item from the mobile pickup location at the designated time on the designated day. A user may also elect to have certain preferred mobile pickup locations saved in their account as preferred options. For example, a user may take the same bus at the same time every day travelling from the office to home, and so may designate that bus as a preferred mobile pickup location.

A user may also be provided with a notification when a mobile pickup location with an ordered item is approaching. In various implementations, the GPS coordinates of the mobile pickup location may be tracked by the system and a notification may be sent to the user when the mobile pickup location is within a specified distance. For example, a text or other message may be sent to a user's mobile device which states that the mobile pickup location is estimated to be a certain distance and/or time from arriving at the designated stop. The accuracy of time predictions may be improved over time by learning from previous estimates as compared to actual arrival times.

In various implementations, a mobile pickup location may be attached to the inside or outside of a vehicle. A mobile pickup location that is accessible from the inside of a vehicle may be relatively more convenient to a user who rides the vehicle for a certain distance, or for vehicles which stop for a relatively longer period of time. A mobile pickup location that is accessible from the outside of the vehicle may be relatively more convenient to a user who does not ride the vehicle, but only wishes to retrieve an item at a location where the vehicle stops temporarily. For example, a user may wish to retrieve an item at a bus stop that is convenient for the user, even if the user does not ride the bus to which the mobile pickup location is attached.

In various implementations, a mobile pickup location may be attachable and detachable to and from the vehicle. For example, various mounting mechanisms may be utilized that allow the mobile pickup location to be attached/detached for servicing, loading, or other functions. As another example, the mobile pickup location may be stocked with items at a fulfillment center, and then delivered and attached to the vehicle for delivering the items, after which the mobile pickup location may be detached and returned to the fulfillment center for restocking. For mobile pickup locations that are not removed from a vehicle for restocking, items may be delivered from the fulfillment center to the mobile pickup location at designated times. For example, mobile pickup locations that are attached to busses that are parked at a bus station at the end of a shift (e.g., from 3:00 am to 5:00 am) may be restocked with items during that time.

A block diagram of a materials handling facility, which, in one implementation, may be an order fulfillment facility configured to utilize various systems and methods described herein, is illustrated in FIG. 1. In this example, multiple users 100 may submit orders 120, where each order 120 specifies one or more items from inventory 130 to be shipped to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a user has selected a mobile pickup location, such as the mobile pickup location described below with respect to FIG. 2, as the delivery destination, the item(s) of one or more shipment sets may be picked at the picking operation 140 directly into delivery containers. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers. The delivery container may also include a unique identifier, such as a bar code, QR code, unique number, etc. to enable tracking and identification of the delivery container and association of items placed in the delivery container. For example, during a picking operation, an agent within the materials handling facility may scan the bar code of the delivery container and scan a barcode or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the mobile pickup location upon retrieval of the item, or otherwise made available to a user.

Regardless of the type of delivery container utilized, in some implementations, items for which a mobile pickup location has been selected as the final delivery destination do not need to be packed in a shipping package and can be transported to the mobile pickup location in the delivery container. In other instances, items that are pre-packaged or fragile items that need additional protection prior to transport may be picked and transported to a mobile pickup location in a delivery container. In another implementation, items may be put in bags prior to placement in the delivery container and/or storage compartment to provide confidentiality of the ordered items. In addition, items from multiple shipment sets destined for the same mobile pickup location may be picked into the same delivery container for transport. As delivery containers are filled, an item routing operation 145 may route the filled delivery containers to the appropriate transporting operation 155 for transport to the designated mobile pickup location. The item routing operation 145 may be manual or automated. The item routing operation 145 may receive an indication of the mobile pickup location in which each item should be routed from a shipment planning system and route delivery containers to one of two or more transporting operations 170, from which they may be transported to the mobile pickup location.

In other examples, for items not scheduled for delivery without a shipping package to a mobile pickup location, picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. The package routing operation 165 may in various implementations be automated or manual. The package routing operation 165 may receive an indication of the destination to which each packed shipment set should be routed from a central control system. In some instances, the destination may be the final destination identified by the user or a mobile pickup location at which transfer of a shipment set may occur for final delivery to the user. The package routing operation 165 may also determine a routing destination for each packed shipment set dependent on the size of a shipping package in which the shipment set is contained and/or based on whether the shipment set will be delivered directly to the user or be delivered to a mobile pickup location.

The arrangement and order of operations illustrated by FIG. 1 is merely one example of many possible implementations of the operation of a materials handling facility, such as an order fulfillment facility, that enables transport of items directly to mobile pickup locations with or without packing the items. Other types of materials handling, manufacturing, or order fulfillment facilities may include different, fewer, or additional operations and resources, according to different implementations.

Figure 2:
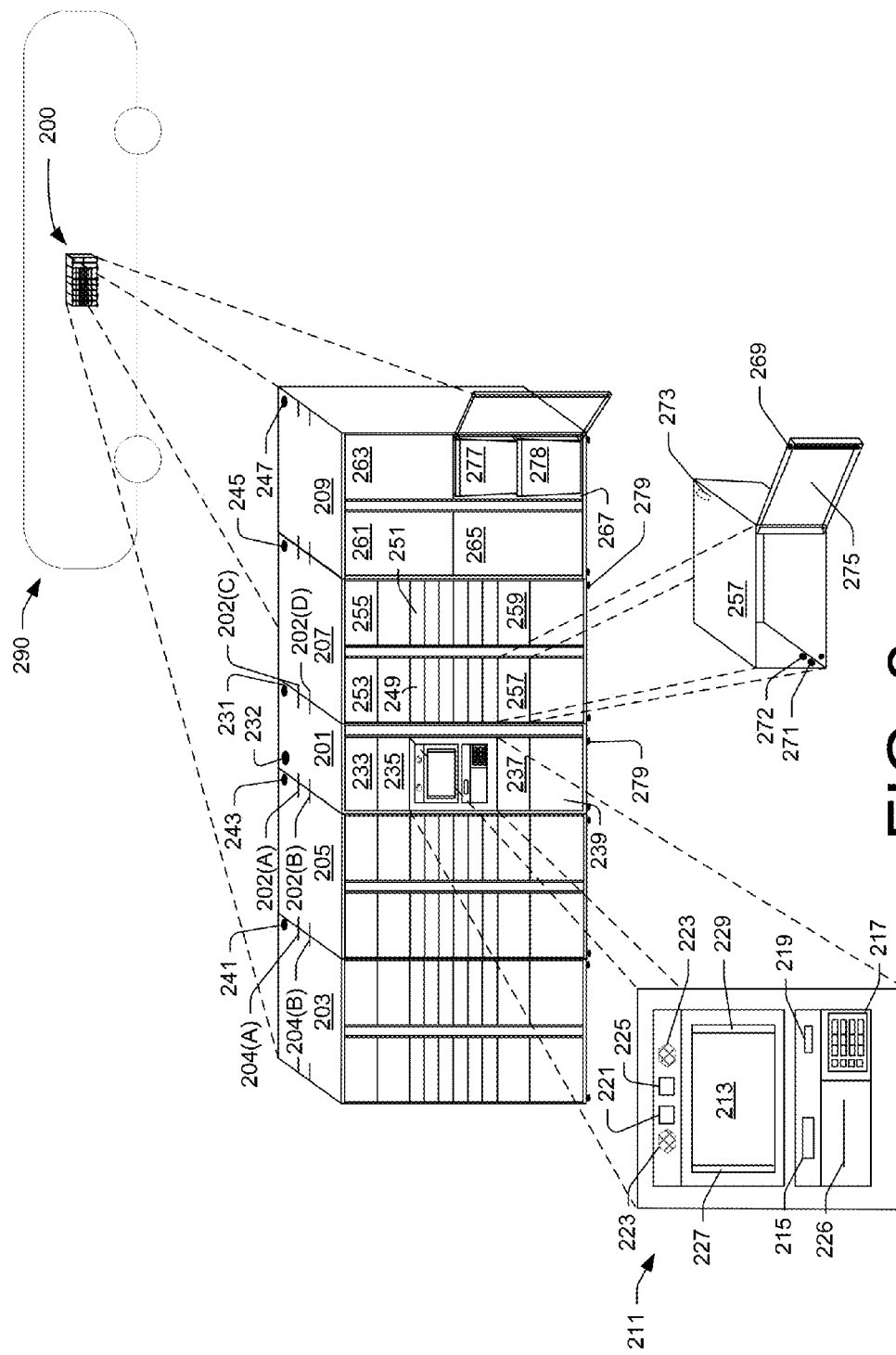
FIG. 2 depicts a block diagram of a mobile pickup location, in one implementation.

FIG. 2 depicts a block diagram of a mobile pickup location 200 that is associated with a vehicle 290, in one implementation. The vehicle 290 may be any type of mobile machine that transports passengers, such as a bus, train, watercraft, aircraft, etc. In various implementations, the mobile pickup location 200 may be attached to either the outside or inside of the vehicle 290. The size of the mobile pickup location 200 may vary, and while for purposes of illustration the example of FIG. 2 includes several sections of storage compartments, fewer and/or smaller storage compartments and/or features may be included depending on the specific implementation.

Figure 5:
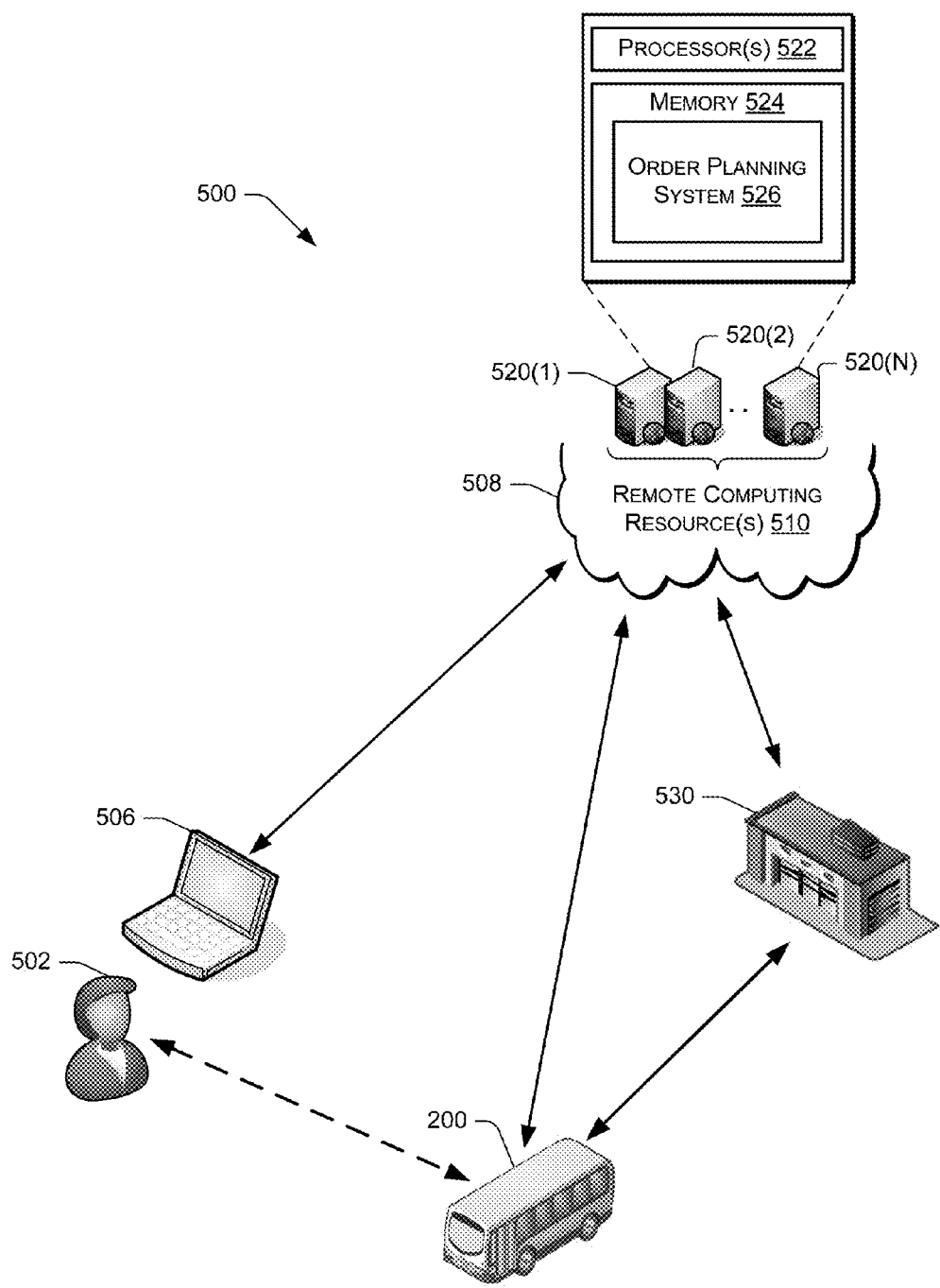
FIG. 5 depicts a block diagram of an order planning system, in one implementation.

The mobile pickup location 200 may include one or more control stations 201 and one or more storage compartment modules 203, 205, 207, 209. The control station 201 acts as the central control point for the mobile pickup location 200, providing power, computing resources, user input and network access to the mobile pickup location 200. For example, the control station 201 may include an internal computing system (not shown), such as a computing system described below with respect to FIG. 11, or other computing system, that is capable of maintaining state information for each storage compartment at the mobile pickup location 200 and providing other computing functions. For example, the internal computing system may include a command component that maintains information as to which storage compartments of the mobile pickup location 200 are empty, which storage compartments include items, the access code(s) or other identifier(s) necessary to open each of the storage compartments and any other information necessary to maintain the mobile pickup location. The command component may also issue commands or instructions to the storage compartment modules to lock/unlock storage compartments, activate sensors, and the like. The mobile pickup location 200 may be configured to obtain information from a remote computing resource, shipment planning system, capacity planning system or material handling facility or may be configured to operate primarily as a stand-alone unit, with limited external communication to provide capacity information and/or to receive/provide order/delivery/transfer information. FIG. 5, described below, illustrates an example of an environment in which a centralized order planning system is provided for remotely communicating with a mobile pickup location 200.

The control station 201 may also include a user interface 211. The user interface 211 is configured to receive and provide information to one or more users of the mobile pickup location 200 and may include, but is not limited to, a display 213, such as a touch-screen display, a scanner 215, a keypad 217, a biometric scanner 219, an audio transducer 221, one or more speakers 223, one or more image capture devices 225, such as a video camera, and any other types of input or output devices that may support interaction between the mobile pickup location 200 and one or more users. For example, the user interface 211 may also include a credit card reader, the ability to accept money (such as cash or coins) and/or the ability to vend items (e.g., stamps, labels, envelopes, shipping packages) using a vending slot 226. Providing the ability for the mobile pickup location 200 to accept credit cards and/or money enables the delivery of orders to a storage compartment at the mobile pickup location 200 for which the items are paid for at the time of pickup (e.g. cash on delivery). Likewise enabling vending of items, such as stamps or envelopes, supports the ability for users to utilize a mobile pickup location to ship or deliver goods, as described in more detail below.

In addition to including user input and output devices, the user interface 211 may also include the ability to collect particulates, such as for use in detection of hazardous (e.g., explosives) or banned substances (e.g. drugs). In one implementation, the user interface 211 may include a particulate sensor that includes a forced air ejection component 227 and an air intake component 229. The air ejection component expels air from a left side of the display 213 while a user is interacting with or otherwise within a predetermined range of the display 213. Opposite the air ejection component 227, the air intake component 229 collects the ejected air and any particulates that are collected as the air passes over the display 213 and past the user's hand or fingers as they interact with the display 213. Collected particulates may be scanned or otherwise processed to determine if potentially hazardous or banned substances may be placed in a storage compartment using any known particulate testing technique. If particulates indicating the potential presence of hazardous or banned substances are detected, the control station 201 may determine to not open a storage compartment door, may alert the authorities, or take other protective actions (such as shutting down the mobile pickup location or performing additional tests).

In certain smaller implementations for a mobile pickup location 200, the user interface 211 may include more limited features. For example, in one implementation the user interface 211 may include a relatively small display 213 with only a keypad 217 for providing input. In certain other implementations, these and other features may also be eliminated, wherein control of the mobile pickup location 200 may primarily be provided remotely. For example, in order to access a storage compartment, a user may send or reply to a text message to or from a centralized remotely located control system, which controls the mobile pickup location 200 to open the storage compartment door so that the user can retrieve the ordered item.

The control station 201 may include a connector component configured to provide wired and/or wireless network connectivity with the other storage compartment modules 203, 205, 207, 209, as well as to remote computing devices (FIG. 5) or materials handling facilities. Wireless connectivity may be implemented using a wireless antenna 231, which may provide both receive and transmit functionality. Power and/or network communication with remote computing devices may be obtained from a main access point 232. In addition, in some implementations, the control station 201 may include one or more storage compartments 233, 235, 237, 239. As described in more detail below with respect to the storage compartment modules 203, 205, 207, 209, the storage compartments 233, 235, 237, 239 of the control station 201 may be of any size or configuration. As with each of the other storage compartments, the storage compartments 233, 235, 237, 239 of the control station 201 may include an automated locking mechanism, image capture device, a motion or presence detection mechanism, temperature sensor, etc. Alternatively, in some implementations one or more of the storage compartments may be utilized as an additional user interface. For example, storage compartment 239 may be removed and the space remaining may be utilized to provide a scale or other type of weight determination component to allow users to weigh items for shipment, determine the cost necessary to ship the item, and pay for shipping using the user interface 211.

The control station 201 may include one or more connector components 202(A), 202(B), 202(C), 202(D) to which a storage compartment module, such as storage compartment module 205 or storage compartment module 207 may connect with the control station 201. For example, connector component 202(A) may provide power to storage compartment module 205, connector component 202(B) may provide communication with storage compartment module 205, connector component 202(C) may provide power to storage compartment module 207 and connector component 202(D) may provide communication with storage compartment module 207. Likewise, the storage compartment modules may also include one or more connector component, such as connector component 204(A), 204(B) to provide power and connectivity to additional storage compartment modules, such as storage compartment module 203.

Each storage compartment module, such as storage compartment modules 203, 205, 207, 209, may be configured so the mobile pickup location 200 is modular, such that one or more storage compartment modules can be easily removed or added to the control station 201 of the mobile pickup location 200. The ability to add or remove storage compartment modules at a mobile pickup location 200 supports the ability to easily and quickly expand or remove capacity so that the demand for that mobile pickup location can be satisfied. For example, during the Christmas holiday season, additional storage compartment modules may need to be added to the mobile pickup location 200 to support the increased demand of items ordered by users. As storage compartment modules 203, 205, 207, 209 are added or removed from a mobile pickup location 200, the control station 201 informs the warehouse management system and/or a capacity planning system of the added or removed capacity.

Each storage compartment module 203, 205, 207, 209 includes one or more storage compartments, one or more receptor components for connecting with connector components of a control station 201 (or another storage compartment module) and one or more connector components for allowing other storage compartment modules to connect thereto, thereby providing power and/or connectivity with the control station 201. The storage compartments of each storage compartment module may be of varying sizes and number. As such, storage compartment modules with different storage compartment sizes can be added to a mobile pickup location 200 to optimize the storage compartment configuration to match that of the sizes of orders typically scheduled for delivery to the mobile pickup location.

Figure 11:
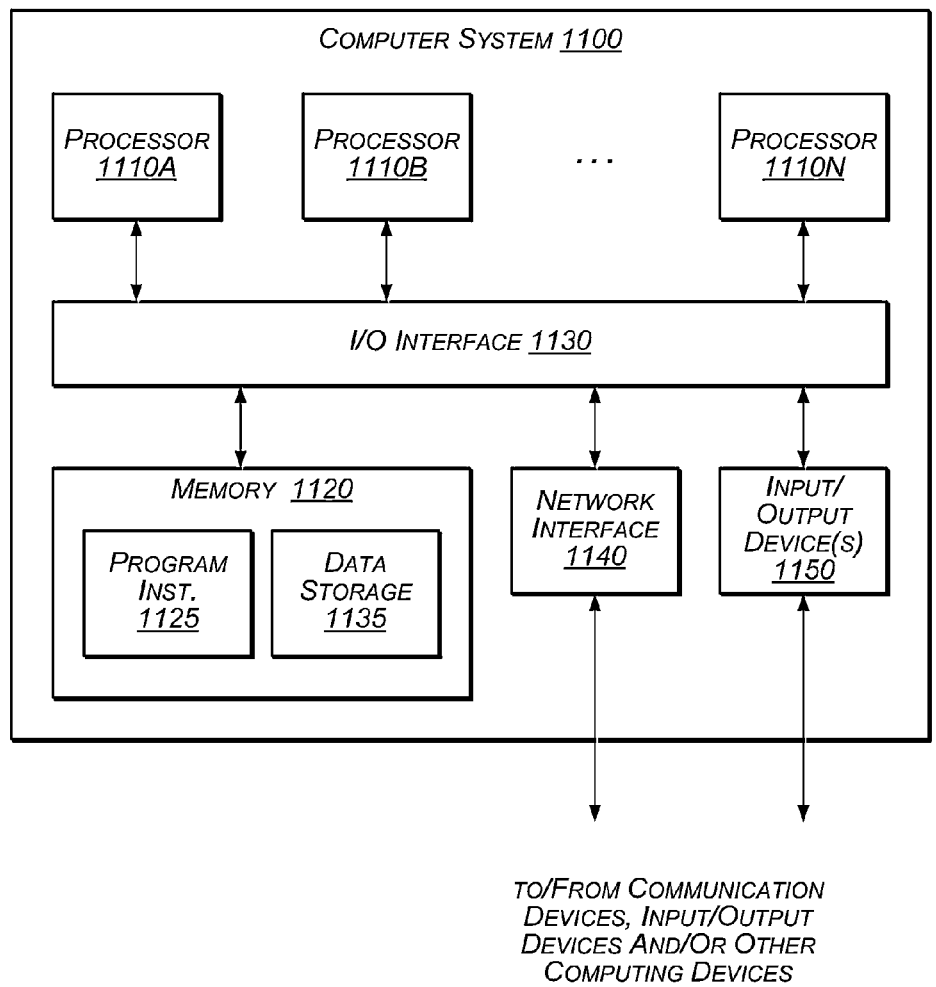
FIG. 11 is a block diagram illustrating an example computer system configured to implement one or more of the systems or processes described herein.

In addition to including storage compartments, power and connectivity points, the storage compartment modules 203, 205, 207, 209 may also include one or more wireless antennas 241, 243, 245, 247 and one or more computing systems, such as the computing system described with respect to FIG. 11, or a simpler computing system such as a printed circuit board, RFID tag, or anything else that may be detectable by the control station 201 and used to identify the storage compartment module. The computing component(s) of each storage compartment module may include a unique identifier of the storage compartment module and configuration information of the storage compartment module, which includes dimension information and location information of each storage compartment of the storage compartment module. The computing component may also include a storage compartment management component configured to control the actuators that enable locking and unlocking of the storage compartment doors of the storage compartment module 203, 205, 207, 209 in response to receiving commands or instructions from a command component of the control station 201.

A storage compartment module, such as storage compartment module 207, when added to a control station 201 and power is applied, provides information to the control station 201 identifying the storage compartment module 207, the number, location, and dimensions of each storage compartment of the storage compartment module and any other configuration or information necessary to enable the control station 201 to control the storage compartment module 207. As illustrated by the comparison between storage compartment module 207 and storage compartment module 209, each storage compartment module may have a variety of different configurations, sizes and numbers of storage compartments. For example, storage compartment module 207 includes a group of small storage compartments, such as small storage compartments 249, 251, a group of medium-sized storage compartments, such as medium-sized storage compartments 253, 255 and a group of larger storage compartments, such as larger storage compartments 257, 259. In contrast, storage compartment module 209 includes four very large storage compartments 261, 263, 265, 267. It will be appreciated that any number, size and configuration of storage compartments of a storage compartment module may be utilized with the various implementations described herein.

In an alternative implementation, rather than providing all of the information from the storage compartment module to the control station 201, the storage compartment module 207 may only provide limited information, such an identifier, to the control station 201. The control station 201, upon receiving the limited information from an added storage compartment module 207, may make a request to a remote computing system, such as a capacity planning system, and obtain information about the configuration, number and sizes of the storage compartments of the added storage compartment module 207.

The control station 201, upon receiving identifying information of an added storage compartment module 207, may allocate the added capacity to the mobile pickup location 200, and may inform a remote computing resource such as will be described in more detail below with respect to FIG. 5. In various implementations, the added storage compartment module may act as a slave component for the control station, receiving instructions (e.g., open storage compartment, close storage compartment, activate image capture device, monitor motion sensor) from the command component of the control station 201 and providing responses (e.g., closed-door, closed, open-door, object/movement detected) to the control station 201 via the storage compartment management component.

Each storage compartment of a storage compartment module 203, 205, 207, 209 or control station 201 includes an upper, bottom, side and rear surfaces and at least one door configured to form a cavity in which items may be stored. In addition, each storage compartment may include various security or other components. For example, looking at the expanded view of storage compartment 257, disposed within the cavity the storage compartment may include a locking mechanism 269, which may be controlled remotely by the command component of the control station 201 via the storage compartment management component, a presence detection sensor 271, a motion sensor 272, an image capture device 273, a temperature sensor 274, and a mirror (or other reflective surface) on the top inside of the storage compartment unit (not shown). The locking mechanism 269 may be controlled by the control station 201, either through wired or wireless communication with the storage compartment management component, to effect locking and unlocking of the door 275 of the storage compartment 257. For example, when a user interacts with the control station 201 via the display 213 and provides an access code or other identifier, the control station 201 may identify a specific storage compartment associated with the access code or other identifier and the command component may wirelessly send instructions to the storage compartment management component of the storage compartment module 207 to unlock a storage compartment 257. The instructions may include a command (e.g., unlock), an address or identifier of the specific storage compartment and any other information necessary for communication between the control station 201 and the storage compartment module 207. In response to receiving the instructions from the command component, the storage compartment management component of the storage compartment module 207 may activate a locking mechanism that moves the pins of the locking mechanism 269 on the door 275 of the identified storage compartment 257 such that the pins retract, thereby disengaging the lock of the storage compartment 257 allowing the door 275 to open. In some implementations, the storage compartment 257 may also include a spring mechanism (not shown) such that when the locking mechanism 269 of the storage compartment 257 is disengaged, the spring mechanism propels the door 275 outward, thereby identifying to a user that the door 275 is unlocked and the storage compartment 257 is accessible.

While the locking mechanism described above utilizes retractable pins, any mechanical, magnetic, electrical or other form of locking mechanism may be utilized with the various implementations described herein. In addition, the storage compartment 257 may also include magnets to help retrieve and close a door when it is not all the way closed. Also, the locking mechanism of different storage compartments and different storage compartment modules may be the same or different. Moreover, while the above example describes sending instructions from the command component of the control station 201 to the storage compartment management component of the storage compartment module, in other implementations, each storage compartment may be controlled and/or communicated with directly by the control station 201 and/or the command component and/or remote computing resources as will be described in more detail below with respect to FIG. 5.

The presence detection sensor 271 may be used to detect the presence or absence of objects in the storage compartment 257. For example, the presence detection sensor 271 may be utilized when a carrier is placing items, delivery containers and/or transfer containers in the storage compartment 257 to confirm that the item is indeed in the storage compartment 257 before the door 275 is closed and locked by the locking mechanism 269. Additionally, the presence detection sensor 271 and/or motion sensor 272 may also be used when a user is picking up an order stored in the storage compartment 257 or when a carrier is removing items, delivery containers and/or transfer containers from the storage compartment 257. For example, when a user interacts with the control station 201 via the touch control display 213 and provides an access code such that a storage compartment 257 is opened, the presence detection sensor 271 and/or motion sensor 272 may be used to confirm that a user has reached into the storage compartment 257 and removed its contents (or added items in the case of returns or shipping), prior to allowing the storage compartment door 275 to be closed and locked with the locking mechanism 269. In some implementations, there may be multiple presence detection sensors 271 and/or motion sensors 272 distributed throughout the inside of a storage compartment to ensure objects/motion is detected. In still another implementation, the bottom of the storage compartment may include protrusions or rises to position thin items so they are detected by the presence detection sensor 271.

The storage compartments, such as storage compartment 257, may also include an image capture device 273, such as a camera, and optionally an illumination component (not shown), such as a light emitting diode (LED), that may be used to illuminate the inside of the storage compartment 257. The image capture device 273 may also be used to detect the presence or absence of items within the storage compartment 257, detect the item itself, for example to simplify returns, as well as for security. For example, the image capture device 273 may be used to identify the type of object located within the storage compartment 257 and/or to identify or record video/images of access with the storage compartment 257. In addition, the image capture device 273 may be used to determine the amount of space available in the storage compartment 257. For example, an image taken by the image capture device 273 may be transmitted via wired or wireless communication to the control station 201 and the control station 201 may determine the amount of space available in the storage compartment 257. Such information may be used to determine if all items of a shipment set will fit in a single storage compartment 257, if all items associated with a storage compartment are present in the storage compartment, or if the shipment set needs to be divided across multiple storage compartments. In addition, the image capture device 273 may also be used to determine if there is sufficient space in a storage compartment 267 to contain a delivery container 277 and/or transfer container 278.

Some storage compartments, such as storage compartments located vertically higher within a storage compartment module 203, 205, 207, 209 or the control station 201, such as storage compartments 233, 235, 253, 255 may also include a reflective surface, such as a mirror, on the inside top, sides and/or back of the storage compartment to enable a user who cannot see directly into the storage compartment to determine via a reflection off the reflective surface whether they have removed all of the items from the storage compartment. In a similar manner, a reflective surface may be included on the bottom, sides or back of a storage compartment, such as storage compartment 239, located lower within a storage compartment module 203, 205, 207, 209 or the control station 201, so users can determine via a reflection, and without having to bend all the way down to see into the storage compartment, whether all items have been removed.

The image capture device 273 may also be used to determine if all of the items have been removed from the storage compartment 257. For example, a current image taken by the image capture device 273 may be compared to a prior image taken when the storage compartment 257 was empty in order to verify that all of the items have been removed from the storage compartment. In one implementation, the current image taken by the image capture device 273 may be transmitted via wired or wireless communication to the control station 201 and the control station 201 may compare the current image to a stored image of the empty storage compartment 257 using image processing software to determine if all of the items have been removed. For example, when a user closes the door of the storage compartment 257 after removing some items, the control station 201 may use the current image from the image capture device 273 to automatically detect and provide a warning to the user if there are items remaining in the storage compartment 257.

Some storage compartments, such as any of the storage compartments located within a storage compartment module 203, 205, 207, 209 or the control station 201, may be refrigerated storage compartments. In various implementations, such refrigerated storage compartments may include their own cooling mechanisms, or may rely on those of neighboring refrigerated storage compartments to which they are environmentally coupled, or alternatively each of the modules 201, 203, 205, 207, 209 or the entire mobile pickup location 200 may have a centralized cooling system. The temperature of previously non-refrigerated storage compartments may be adjusted to become refrigerated storage compartments, and visa-versa. The temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be stored in various refrigerated storage compartments.

In various implementations, the temperatures in the refrigerated storage compartments may be adjusted when items are delivered to be placed in the refrigerated storage compartments, or may adjusted in advance. For example, when a refrigerated item is scheduled to be delivered to a mobile pickup location, the temperature of a refrigerated storage compartment may be adjusted to a temperature that is specified for the refrigerated item in advance so that the refrigerated storage compartment will be at the specified temperature when the item is delivered. In one implementation, the image capture device 273 may be used to capture an image of an item when it is delivered and/or placed in a storage compartment in order to try to determine an appropriate storage temperature for the item. For example, an item may have information on a label which identifies a storage temperature, such as "contents to be stored at 32 degrees F. or lower".

The temperatures in some or all of the refrigerated storage compartments may be controlled by the control station 201. Continuous monitoring and regulating of the temperatures of the refrigerated storage compartments in which such items are kept may be important for verifying the condition of the items. Temperature sensors, such as the temperature sensor 274 of the storage compartment 257, may be utilized for monitoring and regulating the temperature inside each of the refrigerated storage compartments. The refrigerated storage compartments and/or the entire mobile pickup location 200 may be insulated to prevent the dissipation of the cooled air from the refrigerated storage compartments.

In various implementations, one or more of the refrigerated storage compartments may be insulated storage compartments which are cooled by passive cooling elements that are placed within the storage compartments. For example, rather than utilizing an active cooling system which may have components such as compressors and coils, some of the storage compartments may be cooled by passive cooling elements such as cold packs, frozen water bottles, etc. In one implementation, the passive cooling elements may be included in a shipping container with an item when it is shipped to the mobile pickup location. In an alternative implementation, the passive cooling elements may already be at the mobile pickup location and may be added to the insulated storage compartment with the item when it arrives. The number of passive cooling elements to be included with an item may be calculated based on a number of factors. For example, one factor may be an estimated maximum period of time that the item may remain in the storage compartment before it is retrieved by a user. Another factor may be the expected ambient temperature at the mobile pickup location and/or during shipping to the mobile pickup location. Other factors may include the size of the storage compartment, the size and number of items to be included in the storage compartment, etc. Various government regulations may also specify temperatures at which certain items are to be maintained. For example, various federal, state and/or municipal regulations may dictate requirements for storage temperatures for items as well as maximum periods of time that items may be stored at a given temperature. All of these factors may be included in a calculation of how many passive cooling elements should be included in an insulated storage compartment with an item, as well as a determination of a maximum period of time that the item may remain in the storage compartment.

In another example, the mobile pickup location 200 may also include a storage compartment module configured as a drop-box (not shown). Rather than utilizing specific storage compartments of the mobile pickup location 200 to store returned items and/or items for delivery, a storage compartment module configured as a drop-box may be utilized to securely store such items. For example, a drop-box may be configured with a pivoting door or tray that allows items to be placed in the drop-box but not retrieved without having additional access to the drop-box. In some examples, the pivoting door or other form of access may also be locked and access only provided in response to a user interacting with the user interface 211, such as selecting to return or ship an item.

The storage compartment modules 203, 205, 207, 209 as well as the control station 201 may also include self-leveling feet 279 that may be used to level the storage compartment modules 203, 205, 207, 209 and/or control station 201 when located on un-level surfaces. In some configurations, the mobile pickup location 200 may be attached to an interior or exterior surface of the vehicle 290 wherein if the mobile pickup location 200 does not touch the floor, the self-leveling feet 279 may not need to be utilized. In configurations where the self-leveling feet 279 are utilized, they may be adjusted so that a storage compartment module, such as storage compartment module 205, 207, can be positioned so it is flush and aligned with a control station 201 or another storage compartment module. As an alternative to self-leveling feet 279, any other type of support mechanism may be utilized with various implementations described herein for supporting the control station 201 or any storage compartment module 203, 205, 207, 209. Also, the control station 201 and one or more of the storage compartment modules 203, 205, 207, 209 may utilize different types of support mechanisms. For example, the control station 201 may utilize self-leveling feet while the storage compartment modules 203, 205, 207, 209 may utilize rolling casters or wheels. The casters/wheels may further enable the ease with which storage compartment modules may be added or removed from a control station 201, thereby allowing the easy addition/removal of capacity at the mobile pickup location 200. Depending on the type of vehicle 290 and the method of attachment of the mobile pickup location 200, the wheels may be removed or disabled so as to prevent unwanted motion of the mobile pickup location 200 when the vehicle 290 moves.

In various implementations, the mobile pickup location 200 may be attachable and detachable to and from the vehicle 290. For example, various mounting mechanisms may be utilized that allow the mobile pickup location to be attached/detached for servicing or other functions. Special locking mechanisms may be utilized which prevent detachment by anyone other than an authorized agent. Power connections may also be provided for allowing the mobile pickup location 200 to draw power from the vehicle 290 and/or the mobile pickup location may have a rechargeable battery source. In one implementation, the mobile pickup location may be charged and stocked with items at a fulfillment center, and then delivered and attached to the vehicle for delivering the items, after which the mobile pickup location may be detached and returned to the fulfillment center for restocking and recharging.

In various implementations, the mobile pickup location 200 may be attached to the inside or outside of the vehicle 290. A mobile pickup location that is accessible from the inside of a vehicle may be relatively more convenient to a user who rides the vehicle for a certain distance, or for vehicles which stop for a relatively longer period of time. A mobile pickup location that is accessible from the outside of the vehicle may be relatively more convenient to a user who does not ride the vehicle, but only wishes to retrieve an item at a location where the vehicle stops temporarily. In either case, the mobile pickup location 200 may generally be attached in a manner that is intended to cause the least disruption to the normal functions of the vehicle 290 for transporting passengers. For example, if the vehicle 290 is a bus and the mobile pickup location 200 is to be attached to the outside, the location of the attachment may be below the windows of the bus to avoid blocking the view of any of the passengers. In addition, the profile of the mobile pickup location 200 may be streamlined so as to not significantly protrude from the bus. Weatherproofing techniques may be utilized to protect the functionality of the mobile pickup location 200 when it is subjected to weather conditions on the outside of the bus.

Figure 3:
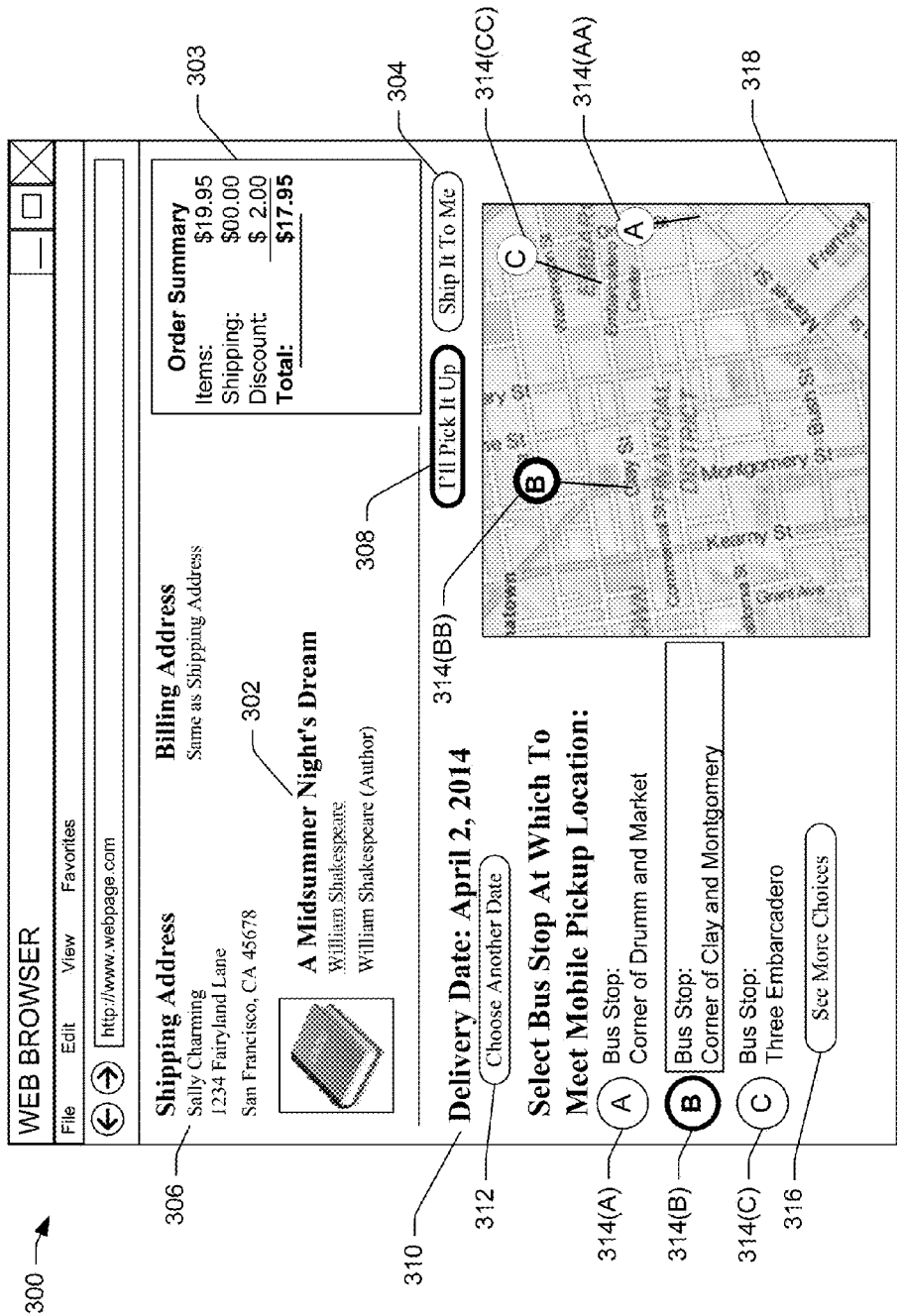
FIGS. 3-4 depict example graphical user interfaces for selecting a mobile pickup location.
Figure 4:
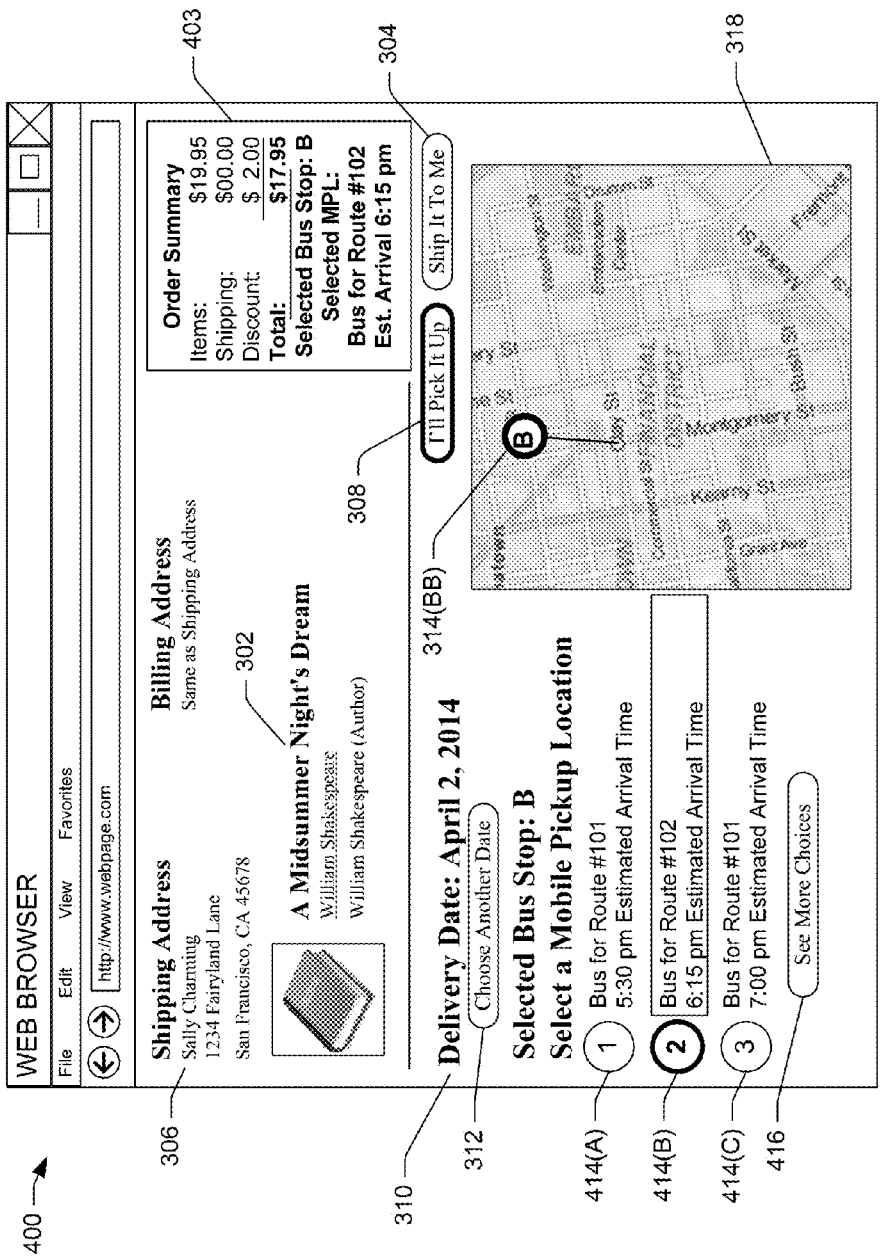

FIGS. 3 and 4 depict graphical user interfaces 300 and 400 for purchasing an item and selecting a mobile pickup location, in one implementation. As shown in FIG. 3, in this example the user has requested to purchase a book entitled "A Midsummer Night's Dream" 302. The cost of the order may be displayed in an order summary window 303. As part of the purchase process, the user may select to have the item delivered to the user (e.g., attended or unattended delivery) or select a mobile pickup location from which the user can retrieve the item. For example, the user may select the "Ship it to me" button 304 and provide a shipping address 306 to which the item is to be delivered. Attended delivery, as used herein, is delivery to a user specified location (e.g., residence or business address) at a prearranged time when the user or other individual will meet the delivery person to receive delivery of the item. Attended delivery includes, but is not limited to a scheduled delivery, COD, items that require signature for delivery (e.g., alcohol), or if there is no secure location at which to leave the item. Unattended delivery, as used herein, is delivery of an item to user specific location (e.g., residence or business address) where the item may be left unattended, such as on the user's front porch or in an apartment mailroom.

Alternatively, the user may select the "I'll pick it up" button 308 and select a mobile pickup location from which the user may retrieve the item. In some implementations, the user may receive a discount or other incentive to utilize the option of retrieving the item from a mobile pickup location.

As part of the purchase process, an order planning system 526 may identify a delivery timeframe 310 indicating the day or days during which the purchased item 302 will be delivered or available for retrieval by the user. To choose another delivery timeframe, a user may select the "choose another date" button 312. If they are satisfied with the delivery timeframe 310, the user may begin the process for selecting a mobile pickup location.

In the example of FIGS. 3 and 4, the mobile pickup locations are associated with public busses, and the process for selecting a mobile pickup location begins with the user selecting a bus stop (FIG. 3), followed by the selection of a mobile pickup location which stops at the bus stop (FIG. 4). In other implementations, other processes may be utilized for selecting a mobile pickup location, as will be described in more detail below. As shown in FIG. 3, the process begins with the user selecting a bus stop for a mobile pickup location, such as bus stop 314(A), 314(B), 314(C), or the user may select the "See More Choices" button 316 to see additional bus stops.

A user may interact with the graphical user interface 300 to select a bus stop by either selecting the description of the bus stop, such as bus stops 314(A), 314(B), 314(C) or by interacting with a bus stop identifier pin 314(AA), 314(BB), 314(CC) displayed on the map 318. In this example, the user has selected bus stop 314(B), as illustrated by the bold around the bus stop pin 314 (BB) and the box indicator around the bus stop description 314(B).

As shown in FIG. 4, once the user has selected the bus stop 314(B), in this example the user may then be presented with options for choosing one of the mobile pickup locations which stops at the selected bus stop. In one implementation, an intermediate step may be provided wherein a user is presented with time window options for the bus stop, and after a time window is selected by the user, the system may display the mobile pickup locations which service the bus stop during the selected time window. For example, if a user selected a time window for "5:00 pm to 7:00 pm", then mobile pickup locations that are scheduled to stop at the bus stop during that time window may be displayed as options for selection by the user. Alternatively, if only a few mobile pickup locations are scheduled to stop at the bus stop during the entire delivery date, the step for selecting the time window may be skipped, and all of the mobile pickup locations that are scheduled to stop at the bus stop on the delivery date may be automatically displayed as options for selection by the user.

As shown in FIG. 4, the process continues with the user selecting a mobile pickup location, such as a mobile pickup location 414(A), 414(B), 414(C), or the user may select the "See More Choices" button 416 to see additional mobile pickup locations. A user may interact with the graphical user interface 400 to select a mobile pickup location by selecting the description of the bus associated with the mobile pickup location, such as is illustrated for mobile pickup locations 414(A), 414(B), 414(C). In this example, the user has selected mobile pickup location 414(B), as illustrated by the box indicator around the description of the bus associated with the mobile pickup location 414(B).

Once the user makes the selection of the mobile pickup location 414(B), the user's order may be scheduled to be delivered to the mobile pickup location 414(B) so that it can be retrieved by the user on the specified day. As indicated in the order summary window 403, the mobile pickup location 414(B) that has been selected corresponds to the "bus for route #102", arriving at approximately 6:15 pm at the selected bus stop option B (i.e., at the corner of Clay and Montgomery as indicated in FIG. 3), on the delivery date of Apr. 2, 2014. In one implementation, once the user completes the order, the user may be provided with instructions (e.g., by email or other electronic messaging) for where and when to meet the mobile pickup location, as well as any other information that the user may need for picking up the item. For example, the user may be provided with the bus stop address, bus number, approximate arrival time, route number, etc. The user may also be provided with an access code for retrieving the ordered item from the storage compartment in the mobile pickup location. Alternatively, the user may be provided with other instructions for gaining access to the storage compartment. For example, the user may be provided with instructions to respond to a text message from the system when the user is at the mobile pickup location and ready to retrieve the item, which may prompt the system to open the storage compartment for the user.

While a specific example process has been described above with respect to FIGS. 3 and 4, it will be appreciated that options for bus stops, routes and/or associated mobile pickup locations may be determined and displayed in a variety of manners and through a variety of processes. For example, a user may specify preferred bus stops, routes and/or mobile pickup locations, a user may specify preferred delivery areas, the order planning system 526 may identify bus stops, routes and/or mobile pickup locations based off of prior user orders and/or distribution locations, the order planning system 526 may identify bus stops, routes and/or mobile pickup locations based on a determined or provided location of the user, or through any other means. The order planning system 526 may identify user location using a variety of techniques. For example, if the user is purchasing an item using a mobile device, global positioning satellite (GPS) information may be provided to the order planning system 526 by the mobile device and used to determine the user's location. Alternatively, an IP address of the user's device may be used to determine a delivery area or user location.

FIG. 5 is a block diagram of an illustrative mobile pickup location ordering environment 500 that enables a user 502 to select a mobile pickup location 200 for retrieval of an ordered item. The mobile pickup location ordering environment 500 includes a user interface, such as a graphical user interface 300 (FIG. 3) and 400 (FIG. 4), that allows a user 502 to place an order for purchase of an item that will be retrieved by the user from a mobile pickup location 200. The user interface may be a graphical user interface, such as graphical user interface 300, 400, an audio only interface, a multi-mode interface, or any other interface for interacting with the user 502. The user interface may be provided to the user 502 through any type of electronic device 506, such as a tablet, desktop, laptop, smart phone, personal digital assistant, netbook, etc. The user interface may be delivered to the electronic device 506 by one or more remote computing resources 510 that make up part or all of an electronic commerce shopping environment. In other embodiments, the user interface may be direct communication between a user and an agent.

The remote computing resources 510 may form a portion of a network-accessible computing platform implemented as a computing infrastructure of processors, storage, software, data access, and other components that is maintained and accessible via a network 508. Services, such as e-commerce shopping services, offered by the remote computing resources 510 do not require the user have knowledge of the physical location and configuration of the system that delivers the services. The electronic device 506 may communicatively couple to the remote computing resources 110 via the network 108 which may represent wired technologies (e.g., wires, USB, fiber optic cable, etc.), wireless technologies (e.g., RF, cellular, satellite, Bluetooth, etc.), and/or other connection technologies. The network 508 carries data between the electronic device and the remote computing resources 510.

After receiving from a user 502 a request to purchase an item and selection of a mobile pickup location, the electronic device 506 may send this information to the remote computing resources 510 over the network 508. As illustrated, the remote computing resources 510 may include one or more servers, such as servers 520(1), 520(2), . . . , 520(N). These servers 520(1)-(N) may be arranged in any number of ways, such as server farms, stacks, and the like that are commonly used in data centers. Furthermore, the servers 520(1)-(N) may include one or more processors 522 and memory 524 which may store an order planning system 526.

The order planning system 526 may be configured, for example, to perform order planning and schedule delivery of orders to various mobile pickup locations or other user specified delivery locations. In some instances, the order planning system 526 may separate an order into shipment sets and instruct one or more materials handling facilities 530 to fulfill the shipment sets to the user specified location or to a user selected mobile pickup location 200 for retrieval by the user. In fulfilling orders to a mobile pickup location, the materials handling facility 530 may fulfill orders using any of the processes discussed above with respect to FIG. 1.

The mobile pickup location 200 may also communicatively couple to the remote computing resources 510 via the network 508. For example, the communications to and from the mobile pickup locations may utilize the main access point 232 and/or the wireless antennas of the mobile pickup locations, such as the wireless antennas 241, 243, 231, 245, 247 described above with respect to FIG. 2. Communications may be to and from the command component of the control station for each of the mobile pickup locations, such as the control station 201, and may also be to and from the storage compartment management components of each connected storage compartment module, such as the storage compartment modules 203, 205, 207, 209.

The order planning system 526 may also be configured, for example, to communicate with the mobile pickup location 200. In various implementations, the general activities of mobile pickup locations, including those related to the planning and implementation of deliveries of items to the mobile pickup locations and the retrieval of the items by users, may be coordinated by the order planning system 526. For example, the order planning system 526 may receive schedule data for the vehicles which the mobile pickup locations are associated with, and may use that schedule data to determine mobile pickup location options for a user, as will be described in more detail below with respect to FIG. 7. In various implementations, the order planning system 526 may also receive tracking data regarding the locations of the mobile pickup locations and use that data for sending notifications to a user. For example, the mobile pickup location 200 may receive GPS signals for determining coordinates, which may be sent to the order planning system 526. The order planning system 526 may thereby track the position of the mobile pickup location 200, and may send a notification to a user when the mobile pickup location 200 is approaching, as will be described in more detail below with respect to FIG. 9.

Figure 6:
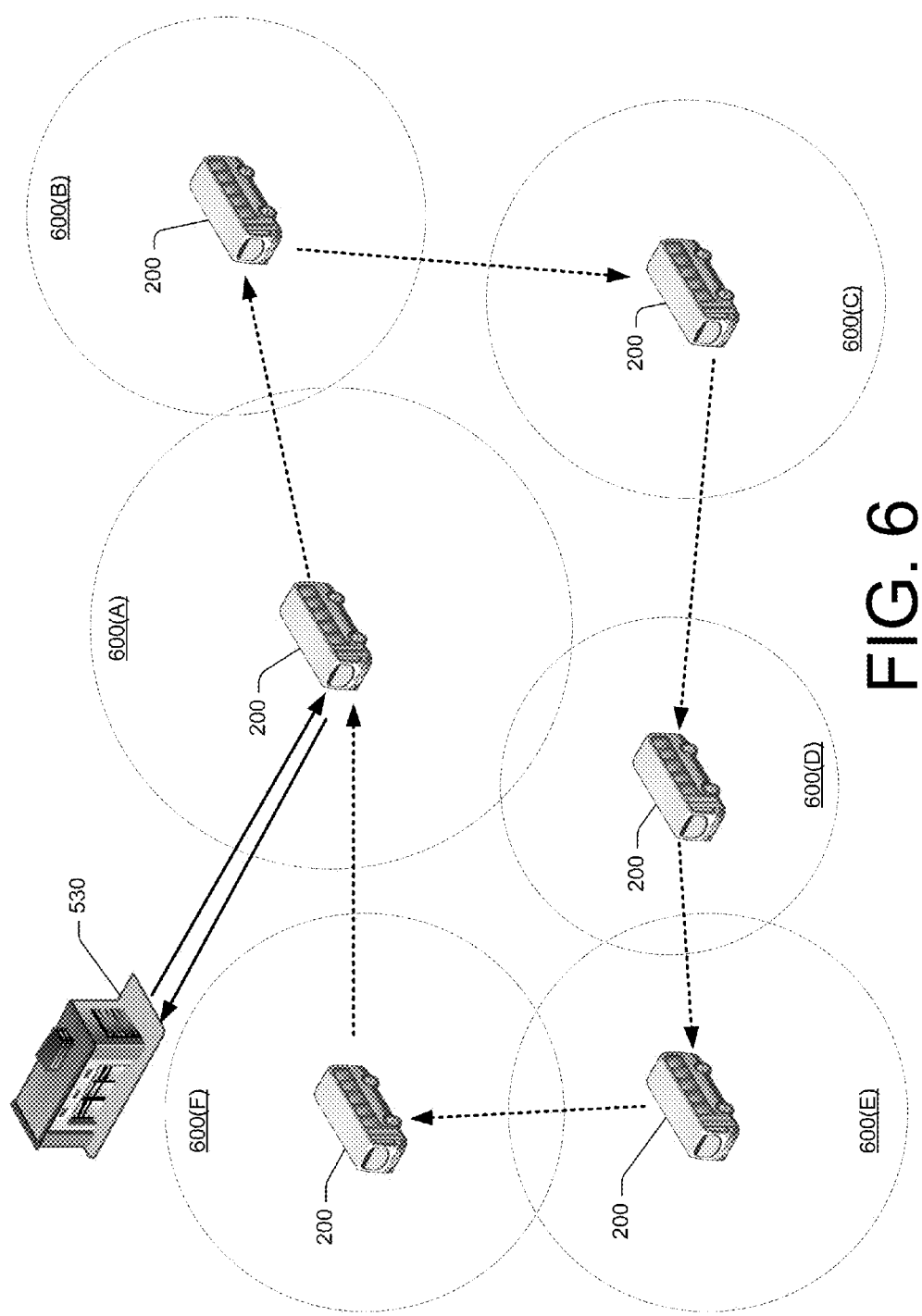
FIG. 6 depicts a block diagram of a mobile pickup location moving to various areas along a route, in one implementation.

FIG. 6 depicts a block diagram of a mobile pickup location 200 moving to various areas 600(A), 600(B), 600(C), 600(D), 600(E), 600(F) along a route, in one implementation. The illustrated positions of the mobile pickup location 200 within each of the areas 600(A), 600(B), 600(C), 600(D), 600(E), 600(F) generally corresponds to a stopping point (e.g., a bus stop) along the route. As described in more detail herein, when an order for one or more items is placed by a user for retrieval at a mobile pickup location, a shipment set for a portion of all of the items in the user's order will be assigned to a materials handling facility 530 for fulfillment and transport to the identified mobile pickup location 200. As part of the ordering process, the order planning system 526 may also confirm that the mobile pickup location 200 has capacity for receiving the items before confirming the order. In various implementations, items may be delivered from the materials handling facility 530 to the mobile pickup location 200 in a designated area at a designated time. For example, the bus associated with the mobile pickup location 200 may be parked at a bus station within the area 600(A) at the end of a shift (e.g., from 3:00 am to 5:00 am), and the mobile pickup location 200 may be restocked with items during that time. As another example, the area 600(A) may be close to the materials handling facility 530 and may be a convenient location for the mobile pickup location 200 to receive deliveries for restocking.

By strategically associating mobile pickup locations 200 with vehicles (e.g., busses) that are available during predetermined timeframes at specific locations, a user may be able to select a mobile pickup location that is convenient for the user, such as mobile pickup location 200 that travels along the route to each of the areas 600(A), 600(B), 600(C), 600(D), 600(E), 600(F). In certain instances, retrieval of an ordered item from a mobile pickup location may be convenient to the user if they would not be available when the item would otherwise be delivered to a selected delivery location (e.g., home), may not want others located at the delivery location to know that they have ordered an item (e.g., a mother may not want a gift for their child delivered to the house) or may not want the item left at an unattended location (e.g., front porch, mailroom) if they are not present when the item is delivered.

When a user places an order for one or more items, the order planning system 526 may determine if there is a mobile pickup location, such as mobile pickup location 200, which travels to one of the areas 600(A), 600(B), 600(C), 600(D), 600(E), 600(F) where the user may wish to retrieve the item at an associated bus stop or while riding the vehicle. In some instances, a user may designate or preselect preferred mobile pickup locations, such as mobile pickup location 200, which the user rides each day to commute between work and home, or which stops at a location that is otherwise convenient for the user. Also, in regions where carriers for delivering items are rare or prohibitively expensive, a mobile pickup location may be utilized to deliver items. For example, for a user who lives in a rural village within one of the areas 600(A), 600(B), 600(C), 600(D), 600(E), 600(F), an item can be delivered in the mobile pickup location 200 to the associated stop where the user may meet the mobile pickup location 200 to retrieve the item.

In various implementations, multiple mobile pickup locations 200 may travel along the same route throughout a day. For example, for a relatively long bus route, several busses may be utilized which travel the route so that a commuter does not have to wait as long for the next bus to come by on the route. In such instances, the order planning system 526 coordinates orders for items which are sent to the mobile pickup locations to ensure that the right items are on the right busses. Also, if a user misses the bus, the user may be able to request from the order planning system information regarding when the bus with the mobile pickup location 200 with the user's ordered item will come by again. A predetermined time period may be established for how long an item will be allowed to remain in the mobile pickup location 200 before being removed and sent back to the materials handling facility 530, or another location. For example, in one implementation, an item may be allowed to remain in a mobile pickup location for up to 3 days before being removed. A user may also provide instructions for shipping the item to an alternative address (e.g., work or home) if the user does not retrieve the item from the mobile pickup location 200 within a certain number of days. In certain implementations, items may also be transferred from one mobile pickup location to another. For example, if a user misses the bus to which the mobile pickup location 200 is attached, the item may be retrieved by an agent and sent in another mobile pickup location which has a stop that is convenient for the user. As another example, for a delivery to a rural village, a single bus may not travel the entire way that is needed to deliver the item, in which case it may be desirable to have an agent transfer the item from one mobile pickup location to another in order to facilitate the delivery of the item to the village.

For items that have been ordered with a mobile pickup location 200 as the location at which the user will retrieve the items, the materials handling facility 530 may prepare and ship the shipment set(s) for that order to the mobile pickup location. In some implementations, those shipment sets may be transported to the mobile pickup location 200 without packing them into shipping packages. For example, shipment sets assigned to mobile pickup location 200 may be picked directly into one or more delivery containers at the materials handling facility 530, transported to the mobile pickup location 200 and loaded into the storage compartments of the mobile pickup location 200.

Figure 7:
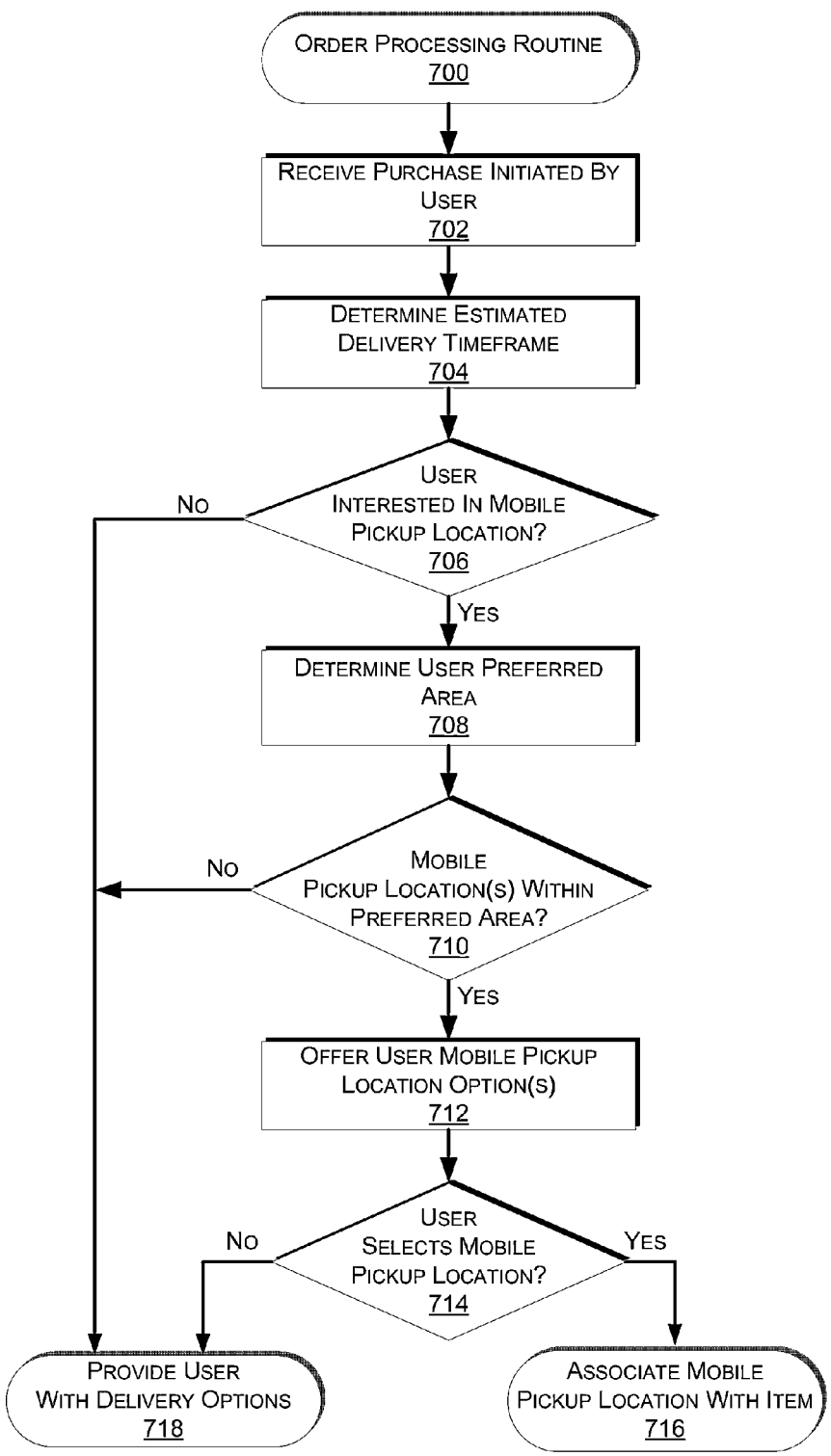
FIG. 7 is a flow diagram illustrating an example process for processing a user order for an item.

FIG. 7 is a flow diagram illustrating an example process 700 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 700 begins upon receiving a purchase request initiated by user, as in 702. Upon receiving a purchase request for an item from a user, a determination is made as to the estimated delivery timeframe for that item, as in 704. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

In addition to determining an estimated delivery timeframe, a determination is made as whether the user is interested in retrieving the item from a mobile pickup location, as in 706. Determining whether a user is interested in retrieving the item from a mobile pickup location may be done, for example, by receiving an interaction from the user through a user interface 300 selecting to pick up the item or otherwise retrieve the item from a mobile pickup location. Alternatively, a user may preselect or provide a preference that they prefer to retrieve their items from mobile pickup locations.

If it is determined that the user is interested in retrieving the item from a mobile pickup location, one or more preferred areas for the user are determined, as in 708. A preferred area may be, for example, a geographic area in which the user lives, works, or through which the user frequently travels/commutes. For example, a preferred area may include a portion of the user's typical commute route to or from work, such as a bus stop where the user gets on the bus. Determining a preferred area may be done by receiving information from the user as to their preferred areas, identifying preferred areas based on a user's past purchase and delivery history, based on a user's known or estimated location, based on an address entered by the user, and the like.

Upon determining the user's preferred area, a determination is made as to whether there are stops (e.g., bus stops) for mobile pickup locations within the preferred area, as in 710. If it is determined that there are stops for mobile pickup locations within the preferred area, the user may be provided with the option to select a preferred stop and an associated mobile pickup location, as in 712 and as discussed above with respect to FIGS. 3 and 4. After the mobile pickup location options are offered to the user, a determination is made as to whether the user has selected a mobile pickup location for delivery of the item, as in 714. If the user has selected a mobile pickup location for delivery of the item, the selected mobile pickup location is associated with the item, as in 716.

In another implementation, a user may select both a mobile pickup location and attended/unattended delivery. For example, a user may select to have an item made available for retrieval from a mobile pickup location for a predefined timeframe (e.g., three days) and if not retrieved during that timeframe have it delivered to a specific location (e.g., their house). In some implementations, the user may receive an incentive to retrieve the item, or pay an additional charge if the item is not retrieved and is then ultimately delivered to the specific location.

If it is determined that the user is not interested in using a mobile pickup location, as in 706, that no mobile pickup location has stops within the area during the delivery timeframe, as in 710, or if the user does not select one of the available mobile pickup locations, as in 714, the example process provides the user with other delivery options, as in 718. Other delivery options may include allowing the user to select an alternative delivery timeframe and/or area, schedule an unattended delivery, and the like. If the user selects an alternative delivery timeframe and/or area, the example process may return to decision block 710 and continue, otherwise the example process completes.

Figure 8:
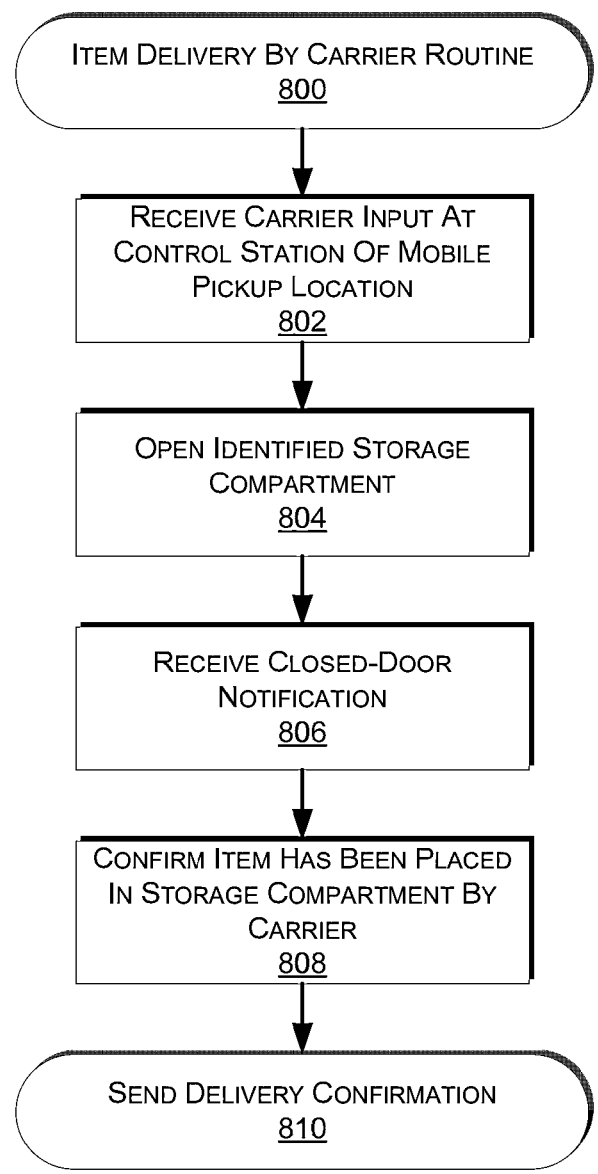
FIG. 8 is a flow diagram illustrating an example process for receiving an item delivered by a carrier at a mobile pickup location.

FIG. 8 is a flow diagram illustrating an example process 800 for receiving an item delivered by a carrier at a mobile pickup location. The example process begins when a carrier input is received at a control station of the mobile pickup location, as in 802. For example, an input may be received from a carrier that may include a tracking identification barcode, which may be scanned at the control station. As another example, the carrier may enter an identification code on the user interface of the control station. In an alternative implementation, rather than the carrier providing an identification code at the control station, the control station may receive an identification code or other instructions from a remote computing resource on behalf of the carrier. For example, a mobile pickup location configured for attachment to a vehicle may be made smaller and less expensive by including little or no user interface. In such an implementation, a carrier may be instructed to respond to a text message or perform another action with their cell phone or other mobile device when they are at the mobile pickup location in order to have an identification code or other instructions sent from a remote computing resource to the control station on behalf of the carrier.

After the carrier input is received at the control station of the mobile pickup location, the associated storage compartment is opened, as in 804. As discussed previously, a storage compartment may be opened by the command component of the control station 201 issuing an open storage compartment instruction to the storage compartment management component of a corresponding storage compartment module 203, 205, 207, 209 identifying the storage compartment of that storage compartment module that is to be opened. The storage compartment management component, upon receipt of an open storage compartment instruction, may cause the lock to disengage, thereby allowing the identified storage compartment door to open.

Once the storage compartment door is opened, the carrier may place the item in the open storage compartment and close the door, in response to which the process receives a closed-door notification, as in 806. Once the storage compartment door is closed, the storage compartment may be checked to confirm that the item has been placed in the storage compartment by the carrier, as in 808. For example, an image capture device 273 included within the open storage compartment may be used to visually monitor and optionally record video of the item being placed in the storage compartment. In addition or as an alternative thereto, the presence detection sensor 271 and/or motion sensor 272 may be used to detect the presence or absence of objects within the storage compartment and/or the motion of placing an object in the opened storage compartment. Such confirmations may be desirable before a user is sent a notification that an item is available for retrieval.

After the item is confirmed as having been placed in the storage compartment by the carrier, the control station sends a delivery confirmation, as in 810. In one implementation, the delivery confirmation may also include tracking data regarding the geographic location of the mobile pickup location when the item was delivered. In one implementation, the sending of the delivery confirmation from a control station to a remote computing resource may be sufficient confirmation for the remote computing resource to send a message to a user that the item has been delivered to the mobile pickup location and is available for pickup. In an alternative implementation, the delivery confirmation may be sent from the control station directly to the user. For example, the control station may send an electronic message, such as a text or email, to the user which indicates that the item has been delivered to the mobile pickup location and will be available for pickup when the user reaches the mobile pickup location.

Figure 9:
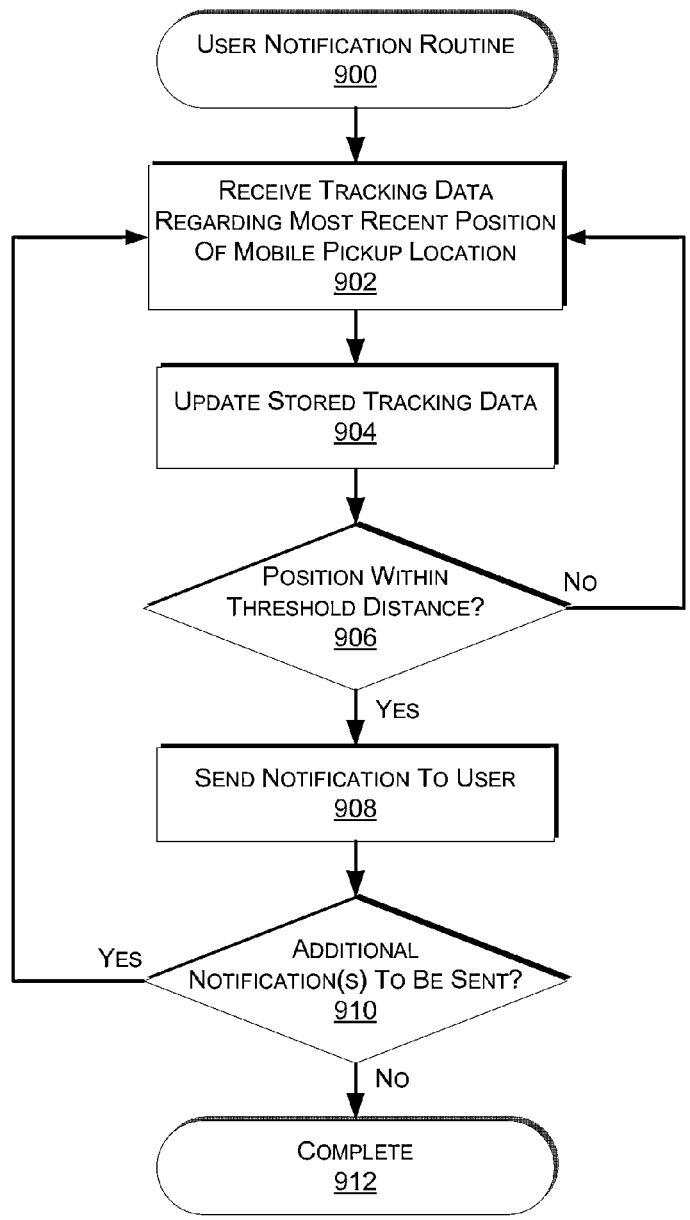
FIG. 9 is a flow diagram illustrating an example process for notifying a user that a mobile pickup location with an ordered item is approaching.

FIG. 9 is a flow diagram illustrating an example process 900 for notifying a user that a mobile pickup location with an ordered item is approaching. The example process begins with receiving tracking data regarding the most recent position of the mobile pickup location, as in 902. For example, GPS signals may be received by the mobile pickup location and may be utilized to determine the GPS coordinates for the mobile pickup location. Once the tracking data regarding the most recent position of the mobile pickup location is received, the stored tracking data regarding the current position is updated, as in 904. The stored tracking data may be utilized for various purposes, such as responding to a request from a user regarding the current coordinates of the mobile pickup location. In one implementation, the user may be able to view a map on a website that shows and updates the current position of the mobile pickup location.

Once the stored tracking data is updated, a determination is made as to whether the current position of the mobile pickup location is within a threshold distance from the user's designated stop, as in 906. If the mobile pickup location is not within the threshold distance, the example process returns to 902 and continues when the next tracking data is received. If the mobile pickup location is within the threshold distance, a notification is sent to the user, as in 908. In various implementations, the notification may provide an estimated distance and/or time related to the arrival of the mobile pickup location. For example, the notification may be a text message sent to a user's cell phone and may indicate that the mobile pickup location is approximately 10 miles away and is estimated to arrive at the user's designated stop in 30 minutes.

Once the notification is sent to the user, a determination is made as to whether one or more additional notifications are to be sent. For example, a user may wish to have a first notification sent when the mobile pickup location is approximately 30 minutes away, and a second notification sent when the mobile pickup location is approximately 5 minutes away. If one or more additional notifications are to be sent, the example process returns to 902 and continues when the next tracking data is received. If no additional notifications are to be sent, the example process completes as in 912.

Figure 10:
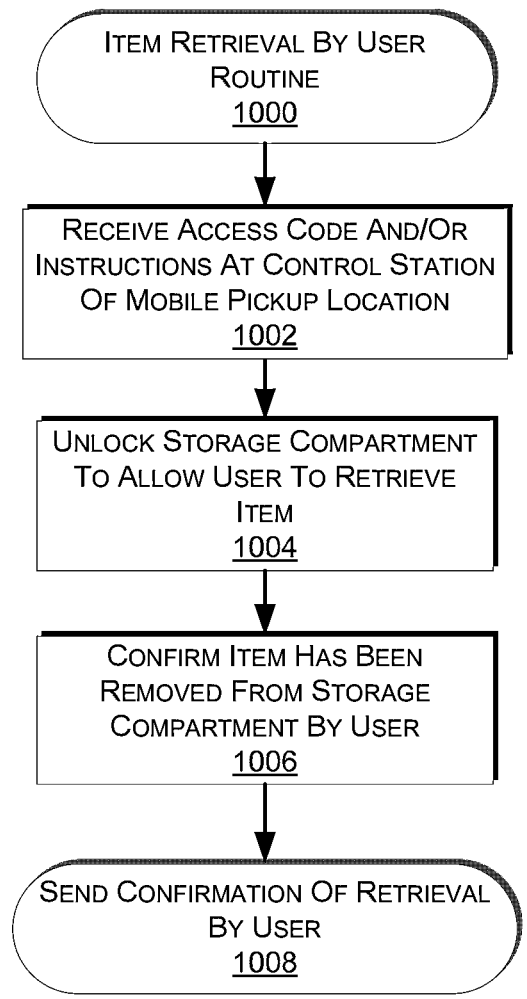
FIG. 10 is a flow diagram illustrating an example process for a user retrieving an item from a mobile pickup location.

FIG. 10 is a flow diagram illustrating an example process 1000 for a user retrieving an item from a mobile pickup location. The example process begins with the receipt of an access code and/or instructions at a control station of the mobile pickup location, as in 1002. An access code may include a unique identifier, such as a PIN that may be input by the user on a user interface of the control station and/or scanning of a barcode, QR code, etc. The access code may have been provided to the user as part of a message indicating that the item is available to be retrieved from the mobile pickup location. In an alternative implementation, rather than the user providing an access code at the control station, the control station may receive an access code or other instructions from a remote computing resource for unlocking a storage compartment. For example, a mobile pickup location configured for attachment to a vehicle may be made smaller and less expensive by including little or no user interface. In such an implementation, a user may be instructed to respond to a text message or perform another action with their cell phone or other device when they are at the mobile pickup location in order to have an access code or other instructions sent from a remote computing resource to the control station for providing access to the storage compartment.

Once the access code or other instructions are received, the storage compartment associated with the access code or other instruction is unlocked so as to allow the user to retrieve the item, as in 1004. Once the user has retrieved the item, a confirmation is made that the item has been removed from the storage compartment by the user, as in 1006. For example, the confirmation may include determining whether a closed-door notification has been received, as indicating that the user has closed the door of the storage compartment after retrieving the item. In addition, if an image capture device 273 within the storage compartment has been activated, video or images captured by the image capture device 273 may be reviewed or analyzed to confirm that the user has removed the item from the storage compartment. In addition or as an alternative thereto, a presence detection sensor 271 and/or motion sensor 272 within the storage compartment may be queried to confirm that the item has been removed from the storage compartment by the user.

Once a confirmation has been made that the item has been removed from the storage compartment by the user, the control station sends a confirmation of the retrieval by the user, as in 1008. The confirmation of the retrieval by the user may also include additional information such as the date and time of the retrieval, as well as the geographic position of the mobile pickup location when the item was retrieved. In various implementations, a message may be sent to the user confirming the retrieval, as a safety measure to ensure that it was the user and not another party that retrieved the item from the storage compartment.

FIG. 11 is a block diagram illustrating an example computer system 1100 configured to implement one or more of the systems or processes described herein. In various examples, the block diagram may be illustrative of one or more aspects of the control station 201 (FIG. 2), the electronic device 506 (FIG. 5), and/or the remote computing resource(s) 510 (FIG. 5) discussed above. In the illustrated implementation, the computer system 1100 includes one or more processors 1110A, 1110B through 1110N, coupled to a non-transitory computer readable storage medium 1120 via an input/output (I/O) interface 1130. The computer system 1100 further includes a network interface 1140 coupled to an I/O interface 1130, and one or more input/output devices 1150. In some implementations, it is contemplated that components of an order planning system or mobile pickup location (e.g., user interface, command component, storage compartment management component, control station) may be implemented using a single instance of the computer system 1100, while in other implementations, multiple such systems or multiple nodes making up the computer system 1100 may be configured to host different portions, components or instances of an order planning system or mobile pickup location. For example, in one implementation, some data sources or services (e.g., receiving schedule data regarding vehicles with which the mobile pickup locations are associated, receiving GPS data, receiving data regarding the storage compartments of mobile pickup locations and whether users have retrieved items) may be implemented via one or more nodes of the computer system 1100 that are distinct from those nodes implementing other data sources or services (e.g., determining mobile pickup location options for a user, sending a notification to a user when a mobile pickup location is approaching, providing commands to open a storage compartment). In some implementations, a given node may implement the functionality of more than one component of an order planning system and/or a mobile pickup location.

In various implementations, the computer system 1100 may be a uniprocessor system including one processor 1110A, or a multiprocessor system including several processors 1110A-1110N (e.g., two, four, eight, or another suitable number). The processors 1110A-1110N may be any suitable processor capable of executing instructions. For example, in various implementations the processors 1110A-1110N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1110A-1110N may commonly, but not necessarily, implement the same ISA.

The non-transitory computer readable storage medium 1120 may be configured to store executable instructions and/or data accessible by the one or more processors 1110A-1110N. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1125 and data storage 1135, respectively. In other implementations, program instructions and/or data may be received, sent or stored upon different types of computer-accessible media, such as non-transitory media, or on similar media separate from the non-transitory computer readable storage medium 1120 or the computer system 1100. Generally speaking, a non-transitory, computer readable storage medium may include storage media or memory media such as magnetic or optical media, e.g., disk or CD/DVD-ROM coupled to the computer system 1100 via the I/O interface 1130. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1140.

In one implementation, the I/O interface 1130 may be configured to coordinate I/O traffic between the processors 1110A-1110N, the non-transitory computer readable storage medium 1120, and any peripheral devices in the device, such as the computer systems of the storage compartment modules, the network interface 1140 or other peripheral interfaces, such as input/output devices 1150. In some implementations, the I/O interface 1130 may perform any necessary protocol, timing or other data transformations to convert data signals from one component (e.g., non-transitory computer readable storage medium 1120) into a format suitable for use by another component (e.g., processors 1110A-1110N). In some implementations, the I/O interface 1130 may include support for devices attached through various types of peripheral buses, such as a variant of the Peripheral Component Interconnect (PCI) bus standard or the Universal Serial Bus (USB) standard, for example. In some implementations, the function of the I/O interface 1130 may be split into two or more separate components, such as a north bridge and a south bridge, for example. Also, in some implementations, some or all of the functionality of the I/O interface 1130, such as an interface to the non-transitory computer readable storage medium 1120, may be incorporated directly into the processors 1110A-1110N.

The network interface 1140 may be configured to allow data to be exchanged between the computer system 1100 and other devices attached to a network, such as other computer systems, or between nodes of the computer system 1100. For example, the network interface 1140 may utilize the wireless antennas 241, 243, 231, 245, 247 to allow interaction and interface between the order planning system 526 and the command component of the control station 201 and the storage compartment management component of each connected storage compartment module 203, 205, 207, 209. In various implementations, the network interface 1140 may support communication via wired or wireless general data networks, such as any suitable type of Ethernet network. For example, the network interface 1140 may support communication via telecommunications/telephony networks such as analog voice networks or digital fiber communications networks, via storage area networks such as Fibre Channel SANs, or via any other suitable type of network and/or protocol.

Input/output devices 1150 may, in some implementations, include one or more display terminals, keyboards, keypads, touchpads, scanning devices, voice or optical recognition devices, or any other devices suitable for entering or retrieving data by one or more computer systems 1100. Multiple input/output devices 1150, such as a user interface for the order planning system 526 and/or the user interface 211, may be present in the computer system 1100 or may be distributed on various nodes of the computer system 1100. In some implementations, similar input/output devices may be separate from the computer system 1100 and may interact with one or more nodes of the computer system 1100 through a wired or wireless connection, such as over the network interface 1140. For example, the computer systems of the storage compartment modules 203, 205, 207, 209 and/or the locking mechanisms of those storage compartment modules may communicate with the computer system 1100 as input/output devices 1150 over wired or wireless network interface 1140.

As shown in FIG. 11, the memory 1120 may include program instructions 1125 which may be configured to implement an order planning system and/or mobile pickup location data storage 1135, which may comprise various tables, databases and/or other data structures accessible by the program instructions 1125. In one implementation, the program instructions 1125 may include various software modules configured to implement a user interface 211, security, locking and unlocking of storage compartments, management of the mobile pickup location, and functions of the order planning system 526, such as determining mobile pickup location options for users and scheduling the delivery and retrieval of items to and from the mobile pickup locations. The data storage 1135 may include various data representing presence or absence of items contained in various storage compartments, access information for various storage compartments and/or other parameter values. The data storage 1135 may also include one or more data stores for maintaining data representing available storage capacity, item deliveries, retrievals, returns, hold orders, partial orders, transfer container locations, schedule data for mobile pickup locations, and other information utilized by the order planning system and/or mobile pickup location.

In various implementations, the parameter values and other data illustrated herein as being included in one or more data stores may be combined with other information not described or may be partitioned differently into more, fewer, or different data structures. In some implementations, data stores used in the order planning system and/or in a mobile pickup location and/or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up a mobile pickup location system and/or any of the various components thereof described herein.

Those skilled in the art will appreciate that the computing system 1100 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computing system 1100 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
 a mobile pickup location apparatus that is associated with and configured to be attached to a vehicle that transports passengers along a route according to a schedule for transporting the passengers, the mobile pickup location apparatus comprising:
a storage compartment with a locking mechanism;
a control station configured to control the locking mechanism, the control station comprising an input device; and
a mounting mechanism that is configured to attach the mobile pickup location apparatus to an inside surface of the vehicle to enable a user to retrieve an item from the storage compartment while the user is riding as a passenger in the vehicle; and
a computing system implementing an order planning system, the computing system comprising:
one or more processors; and
a memory coupled to the one or more processors and storing program instructions that when executed by the one or more processors cause the one or more processors to at least:
receive from a user a selection of an item;
determine a user preferred area;
determine a preferred timeframe;
identify the mobile pickup location apparatus as a delivery option for the user based on an evaluation of received schedule data for the vehicle that indicates that the vehicle will be travelling and will stop at a stopping point in the preferred area during at least a portion of the preferred timeframe;
present the mobile pickup location apparatus as a delivery option to the user;
receive a selection of the mobile pickup location apparatus from the user as a selected delivery option; and
based on the selection by the user of the mobile pickup location apparatus as the selected delivery option, provide an access code to enable the user to retrieve the item from the storage compartment of the mobile pickup location apparatus and associate the delivery of the item with the mobile pickup location apparatus so that the item will be delivered to the mobile pickup location apparatus as attached to the inside surface of the vehicle to enable the user to meet the vehicle in the preferred area at the stopping point during at least a portion of the preferred timeframe and to retrieve the item while the user is riding as a passenger in the vehicle; and
wherein the control station of the mobile pickup location apparatus, in response to a receipt of the access code while the user is riding as a passenger in the vehicle, controls the locking mechanism to unlock the storage compartment that contains the item to enable the user to retrieve the item from the storage compartment while the user is riding as a passenger in the vehicle.

2. The system of claim 1, wherein the user preferred area is determined according to an area that includes an address that is input by the user.

3. The system of claim 1, wherein the stopping point in the user preferred area where the vehicle makes a stop is for at least one of picking up or dropping off passengers.

4. The system of claim 1, wherein the mounting mechanism that attaches the mobile pickup location apparatus to the inside surface of the vehicle comprises a locking mechanism that prevents detachment of the mobile pickup location apparatus from the vehicle.

5. The system of claim 1, wherein the mobile pickup location apparatus is attached to an outside surface of the vehicle to enable the user to retrieve the item while the vehicle is stopped at the stopping point in the user preferred area and without needing to enter the vehicle.

6. The system of claim 1, wherein the program instructions when executed by the one or more processors further cause the one or more processors to provide a notification to the user when the mobile pickup location apparatus is approaching the stopping point.

7. The system of claim 6, wherein the notification indicates an estimate of time related to when the mobile pickup location apparatus will arrive at the stopping point where the user may meet the vehicle for retrieving the item from the mobile pickup location apparatus.

8. A system, comprising:
a mobile pickup location apparatus that is associated with and configured to be attached to a vehicle that transports passengers along a route according to a schedule for transporting the passengers, the mobile pickup location apparatus comprising:
a storage compartment with a locking mechanism; and
a control station configured to control the locking mechanism; and
a computing system, comprising:
one or more processors; and
a memory coupled to the one or more processors and storing program instructions that when executed by the one or more processors cause the one or more processors to at least:
receive schedule data for the vehicle, the schedule data indicating when the vehicle is expected to arrive at scheduled stopping points along the route;
determine that the mobile pickup location apparatus is a delivery option for delivering an ordered item to a user based at least in part on the schedule data;
based on a selection by the user of the mobile pickup location apparatus for the delivery of the ordered item, associate the mobile pickup location apparatus with the ordered item;
monitor a position of the mobile pickup location apparatus, wherein the position is monitored relative to a stopping point where the user may meet the vehicle to retrieve the item from the storage compartment of the mobile pickup location apparatus by performing a specified action to cause the control station of the mobile pickup location apparatus to control the locking mechanism to unlock the storage compartment;
determine when a proximity of the mobile pickup location apparatus to the stopping point is within a specified threshold; and
send a notification to the user when the proximity of the mobile pickup location apparatus to the stopping point is within the specified threshold,
wherein when the user meets the vehicle to retrieve the item, the control station of the mobile pickup location apparatus controls the locking mechanism to unlock the storage compartment in response to the specified action that is performed by the user.

9. The system of claim 8, wherein the specified threshold is defined according to at least one of a distance or an amount of time.

10. The system of claim 8, wherein the notification indicates an estimate of time related to when the mobile pickup location apparatus will reach the stopping point.

11. The system of claim 10, wherein the program instructions when executed by the one or more processors further cause the one or more processors to perform a process for estimating the time which is based at least in part on an analysis of data from previous days when the mobile pickup location apparatus travelled to the stopping point.

12. The system of claim 8, wherein the notification includes a text message which indicates that the mobile pickup location apparatus is approaching the stopping point.

13. The system of claim 8, wherein the notification is sent to a user's mobile device.

14. The system of claim 8, wherein the specified action to cause the control station of the mobile pickup location apparatus to control the locking mechanism to unlock the storage compartment is performed with a user's mobile device.

15. The system of claim 14, wherein the specified action includes responding to a message that is sent to the user's mobile device and which instructs the user to respond to the message when the user is at the mobile pickup location apparatus and ready to retrieve the item.

16. The system of claim 8, wherein the program instructions when executed by the one or more processors further cause the one or more processors to provide the user with an access code for accessing the storage compartment that contains the item for the user and the specified action to cause the control station of the mobile pickup location apparatus to control the locking mechanism to unlock the storage compartment is an entry of the access code by the user at the control station.

17. A system, comprising:
a plurality of mobile pickup location apparatuses that are associated with and configured to be attached to vehicles that transport passengers along routes according to schedules for transporting the passengers, each mobile pickup location apparatus comprising:
a storage compartment with a locking mechanism; and
a control station configured to control the locking mechanism; and
a computing system, comprising:
one or more processors; and
a memory coupled to the one or more processors and storing program instructions that when executed by the one or more processors cause the one or more processors to at least:
receive travel schedule data for the vehicles that the plurality of mobile pickup location apparatuses are associated with;
evaluate the travel schedule data to determine one or more mobile pickup location apparatuses which meet criteria for a user;
present options to the user related to the one or more mobile pickup location apparatuses which meet the criteria for the user;
receive a selection from the user of one of the one or more mobile pickup location apparatuses as associated with a corresponding vehicle; and
based on the selection by the user of the mobile pickup location apparatus, provide instructions to the user including at least a time and place where the selected mobile pickup location apparatus is scheduled to be according to the travel schedule data to enable the user to meet the corresponding vehicle,
wherein in response to a performance of a specified action by the user, the control station of the mobile pickup location apparatus controls the locking mechanism to unlock the storage compartment of the mobile pickup location apparatus to enable the user to access the storage compartment.

18. The system of claim 17, wherein the place that is included in the instructions to the user is a stopping point where the vehicle makes a stop to at least one of drop off or pick up passengers.

19. The system of claim 17, wherein the criteria for the user for determining the one or more mobile pickup location apparatuses includes that there be a stopping point within a set distance of an address that is associated with the user.

20. The system of claim 19, wherein the program instructions when executed by the one or more processors further cause the one or more processors to provide the user with a choice of stopping points that meet the criteria, and after the user selects one of the stopping points, provide the user with time options related to when one or more associated mobile pickup location apparatuses are expected to arrive at the selected stopping point according to the travel schedule data.

21. The system of claim 20, wherein a user selection of a time option corresponds to the selection of the mobile pickup location apparatus.

22. The system of claim 17, wherein the program instructions when executed by the one or more processors further cause the one or more processors to provide the user with an option to have an ordered item shipped to an address when the user does not retrieve the ordered item from the selected mobile pickup location apparatus within a specified time period.

23. The system of claim 17, wherein the plurality of vehicles to which the mobile pickup location apparatuses are attached include busses and the travel schedule data corresponds to bus schedules.

24. The system of claim 17, wherein the mobile pickup location apparatus is configured to be attached to an inside surface of the vehicle to enable the user to access the storage compartment while the user is riding as a passenger in the vehicle.

25. The system of claim 8, wherein the mobile pickup location apparatus is configured to be attached to an inside surface of the vehicle to enable the user to access the storage compartment while the user is riding as a passenger in the vehicle.

* * * * *